(12) United States Patent
Kobayashi

(10) Patent No.: US 8,001,466 B2
(45) Date of Patent: Aug. 16, 2011

(54) DOCUMENT PROCESSING APPARATUS AND METHOD

(75) Inventor: Koji Kobayashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1212 days.

(21) Appl. No.: 11/420,338

(22) Filed: May 25, 2006

(65) Prior Publication Data

US 2006/0288278 A1    Dec. 21, 2006

(30) Foreign Application Priority Data

Jun. 17, 2005    (JP) .................................. 2005-178536

(51) Int. Cl.
G06F 17/00    (2006.01)

(52) U.S. Cl. ........................................ 715/243; 715/248

(58) Field of Classification Search .................. 715/243, 715/209, 244, 246, 247, 248, 249, 250, 255

See application file for complete search history.

(56) References Cited

U.S. PATENT DOCUMENTS

| | | | | |
|---|---|---|---|---|
| 5,369,716 A * | 11/1994 | Sangu | ........................... | 382/317 |
| 5,883,986 A * | 3/1999 | Kopec et al. | ................... | 382/310 |
| 6,134,565 A * | 10/2000 | Hommersom et al. | ....... | 715/210 |
| 6,446,256 B1 * | 9/2002 | Hyman et al. | ................. | 717/143 |
| 6,708,166 B1 * | 3/2004 | Dysart et al. | ........................ | 707/6 |
| 7,047,033 B2 * | 5/2006 | Wyler | ........................... | 455/552.1 |
| 7,155,496 B2 * | 12/2006 | Froyd et al. | .................... | 709/220 |
| 2001/0032217 A1 * | 10/2001 | Huang | ........................... | 707/513 |
| 2003/0229854 A1 * | 12/2003 | Lemay | ........................... | 715/513 |
| 2006/0155700 A1 * | 7/2006 | Dejean et al. | ....................... | 707/6 |
| 2006/0271847 A1 * | 11/2006 | Meunier | ......................... | 715/517 |
| 2008/0109477 A1 * | 5/2008 | Lue | ............................... | 707/102 |

FOREIGN PATENT DOCUMENTS

| | | |
|---|---|---|
| JP | 6-162104 | 6/1994 |
| JP | 7-37036 | 2/1995 |
| JP | 7-73271 | 3/1995 |
| JP | 11-66196 | 3/1999 |
| JP | 11-250041 | 9/1999 |
| JP | 2000-339347 | 12/2000 |
| JP | 2001-297303 | 10/2001 |

OTHER PUBLICATIONS

Trentini, Andrea,"A java-based framework to support computer-assisted creatrion of structured XML documents", ACM, 2002, pp. 48-53.*
Lumley et al."A Framework for Structure, Layout & Function in Document", ACM, 2005, pp. 32-41.*
Joao batista S. de Oliveria, "Two Algorithms for Automatic Document page Layout", ACM, 2008, pp. 141-149.*
U.S. Appl. No. 11/611,530, filed Dec. 15, 2006, Kobayshi.

* cited by examiner

*Primary Examiner* — Laurie Ries
(74) *Attorney, Agent, or Firm* — Oblon, Spivak, McClelland, Maier & Neustadt, L.L.P.

(57) ABSTRACT

A document processing apparatus includes a layout analysis unit which extracts document elements by analyzing data of a document, determines relationship between the document elements, extract a group of mutually related document elements as an object And an independent document element as an object, and generates structure information defining one or more of the objects in the document; and a structure converting unit which converts the structure information generated by the layout analysis unit into display information for display in a display mode.

18 Claims, 29 Drawing Sheets

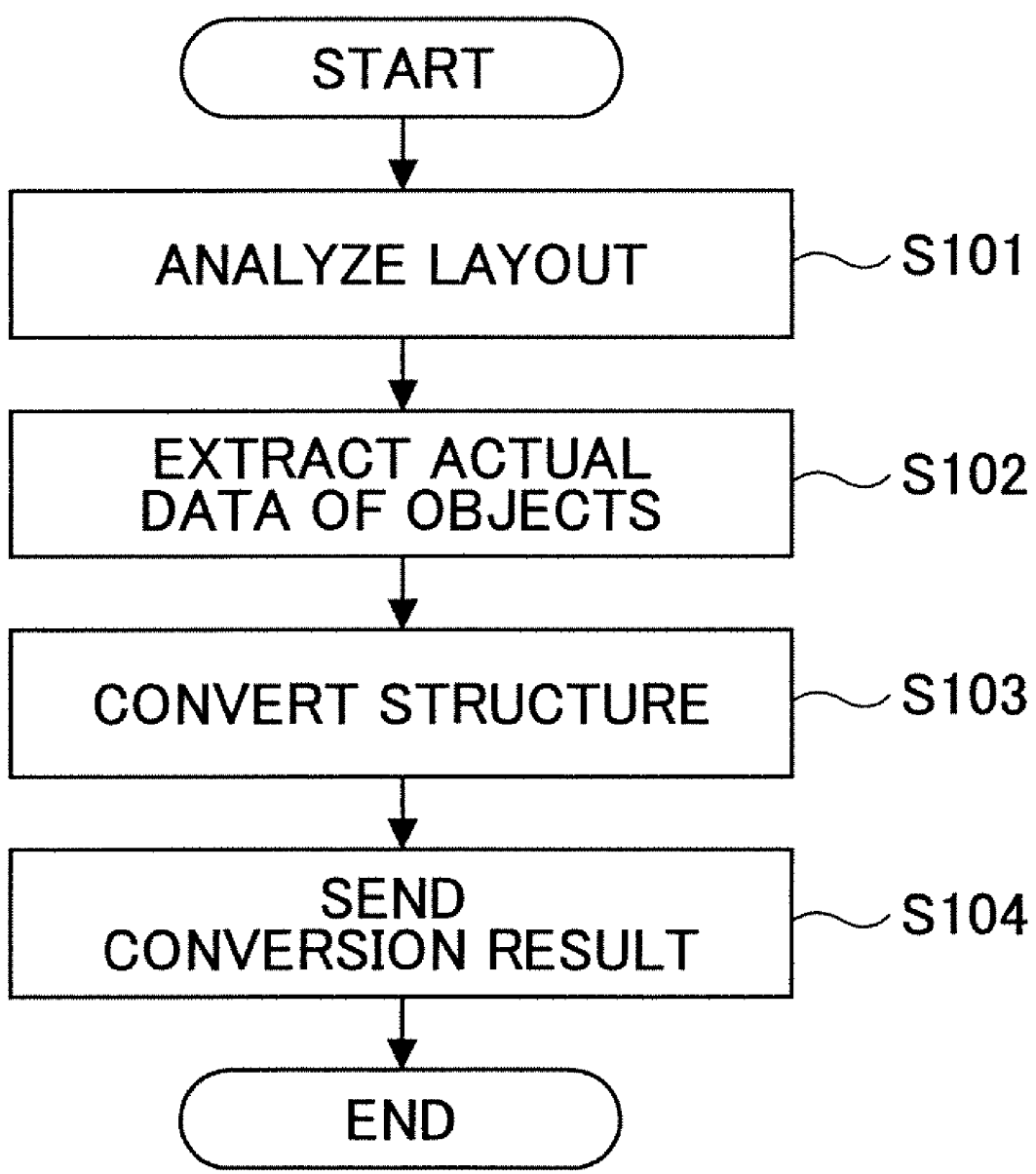

FIG.6

DATA DELIVERY APPARATUS

1. SCOPE OF CLAIM

Description of the scope of claims. A unit to input data the structure of which is analyzed, a unit

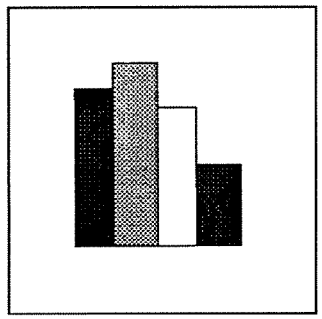

2. OBJECT OF THE INVENTION

Description of the object of the invention. Data the structure of which is analyzed

3. EMBODIMENTS

Description of the embodiments. A unit to input data the structure of which is analyzed, a unit to determine frequency of structured data for each attribute, and a unit to

FIG.11

```
<?xml version="1.0"?>
<!DOCTYPE svg PUBLIC "-//W3C//DTD SVG 1.1//EN" "http://www.w3.org/Graphics/SVG/1.1/DTD/svg11.dtd">
<svg xmlns="http://www.w3.org/2000/svg" xmlns:xlink="http://www.w3.org/1999/xlink" version="1.1"
     width="100%" height="100%" viewBox="0 0 P-WIDTH P-HEIGHT">                                    ----(1)
  <image width="WIDTH" height="HEIGHT" visibility="hidden" xlink:href="OBJ">                       ----(2)
    <set attributeName="visibility" to="visible" begin="1s" dur="3s" fill="remove"/>               ----(3)
  </image>
  <image width="WIDTH" height="HEIGHT" visibility="hidden" xlink:href="OBJ">                       ----(4)
    <set attributeName="visibility" to="visible" begin="4s" dur="3s" fill="remove"/>
  </image>
  <image width="WIDTH" height="HEIGHT" visibility="hidden" xlink:href="OBJ">                       ----(5)
    <set attributeName="visibility" to="visible" begin="7s" dur="3s" fill="remove"/>
  </image>
  . . . . .
</svg>
```

FIG.13

```
<?xml version="1.0" encoding="UTF-8"?>
<svg space="preserve" version="1.1" width="100%" height="100%" viewBox="0 0 P-WIDTH P-HEIGHT"
 xmlns:xlink="http://www.w3.org/1999/xlink" xmlns="http://www.w3.org/2000/svg">
<a xlink:href="OBJ">  ────(1)
    <image width="WIDTH" height="HEIGHT" xlink:href="OBJ" />  ────(2)
</a>
<a xlink:href="OBJ">  ────(3)
    <image width="WIDTH" height="HEIGHT" xlink:href="OBJ" />  ────(4)
</a>
<a xlink:href="OBJ">
    <image width="WIDTH" height="HEIGHT" xlink:href="OBJ" />
</a>
    ‥‥‥

</svg>
```

FIG.15
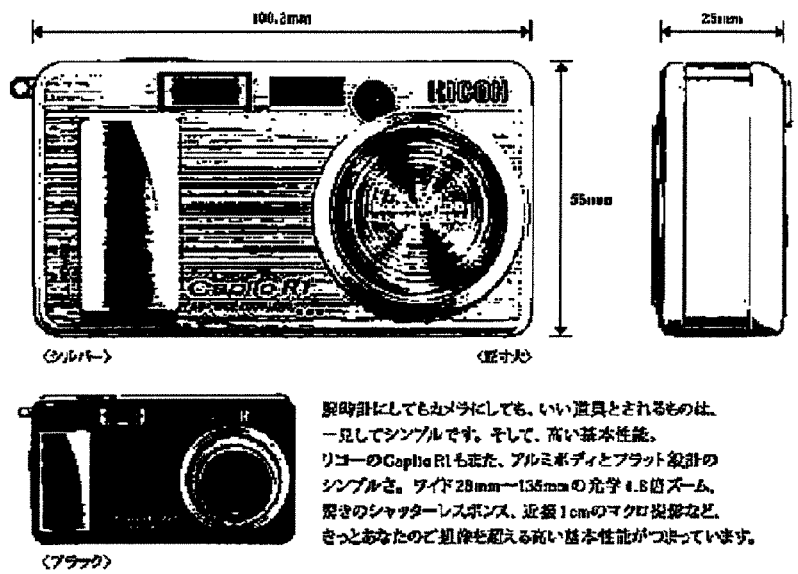
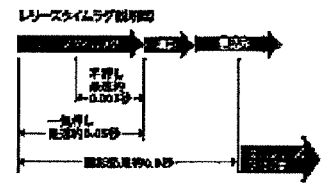

FIG.25
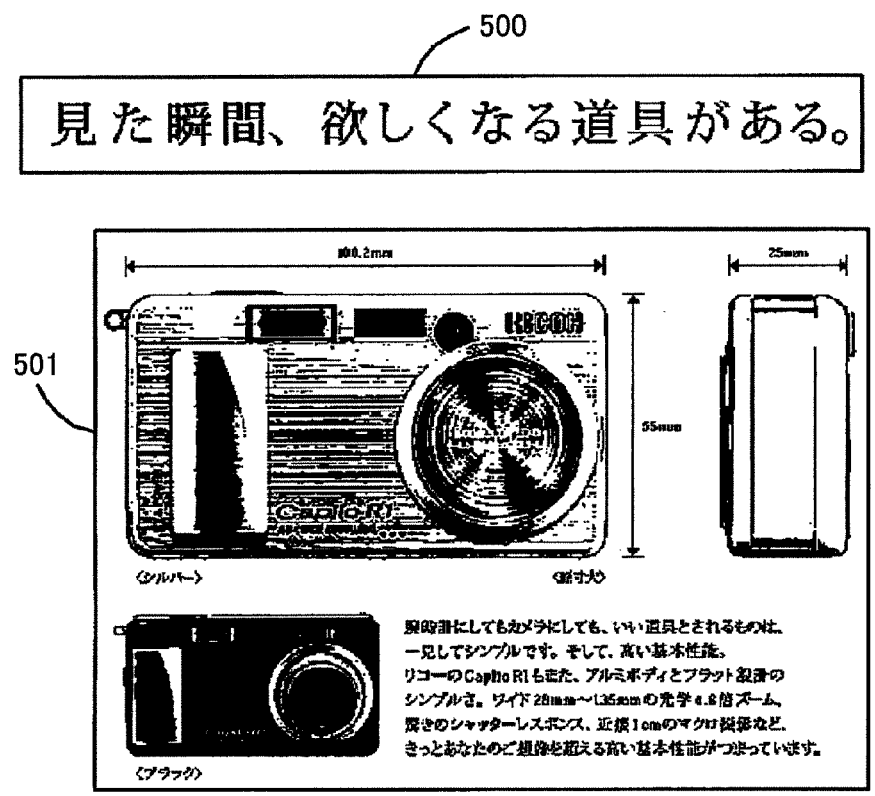

DOCUMENT PROCESSING APPARATUS AND METHOD

BACKGROUND OF THE INVENTION

1. Field of the Invention

The present invention generally relates to a document processing apparatus and a document processing method and more particularly relates to a document processing apparatus and a document processing method for displaying a document having layout information in a display mode suitable for a screen, for example, on a mobile terminal.

2. Description of the Related Art

In patent document 1, a document processing apparatus which extracts and structures the contents of a print document and automatically inputs the structured contents into a computer is disclosed.

The document processing apparatus includes a layout analyzing unit configured to extract layout objects and a layout structure from a document image, a unit configured to extract logical objects based on typographic information obtained from character layout information of the document image, a unit configured to determine the reading order of layout objects and logical objects, a unit configured to extract hierarchical structure, reference structure, relational structure of logical objects as logical structures according to the reading order, and a unit configured to identify the structure of a multi-page document.

In a document search system disclosed in patent document 2, structures of documents are analyzed when creating a document database so that only corresponding portions of HTML documents that match a search condition are presented as search results. In this structure analysis, an HTML document is regarded as having three layers. The attribute of each document segment such as text or image is identified based on HTML tags, the relationship between an image segment and a text segment placed next to each other is evaluated, these segments are combined if they have a close relationship, and a header, which is identified based on HTML tags, and a segment under the header are combined.

A document image recognition apparatus is disclosed in patent document 3. The document image recognition apparatus extracts character areas and graphics/photo areas from an input document image obtained by scanning a print document, performs character recognition for the character areas, performs layout analysis, and generates a PostScript document or a HTML document which matches the input document image. In this layout analysis, titles and headings are also identified.

In a document image recognition method disclosed in patent document 4, the background color of a document image is identified, for example, by color clustering, pixels having colors other than the background color are combined to form connected components, and the connected components are classified into character areas and graphics/photo areas based on at least shape characteristics.

In an area dividing method disclosed in patent document 5, circumscribed rectangles of connected components of black pixels are extracted from an OR-compressed document image, the circumscribed rectangles are classified into characters and others based on their shapes and internal data, the circumscribed rectangles of characters are assembled into character lines and character areas, a histogram of the heights of the circumscribed rectangles of characters (the lengths of the sides which are perpendicular to the character line) is created, and a most common height of rectangles is used as the standard character size.

[Patent document 1] Japanese Patent Application Publication No. 11-250041
[Patent document 2] Japanese Patent Application Publication No. 2000-339347
[Patent document 3] Japanese Patent Application Publication No. 11-66196
[Patent document 4] Japanese Patent Application Publication No. 2001-297303
[Patent document 5] Japanese Patent Application Publication No. 7-73271

With the spread of the Internet and company LANs, technologies to deliver image data to terminal devices such as personal computers (hereafter called PCs) via networks are getting attention. For example, multifunction printers having functions, for example, of a printer, scanner, and image server are being used as image delivery apparatuses.

Also, the performance improvements of mobile terminals such as mobile phones and personal digital assistants (PDA) have made it possible to view document images on such mobile terminals. However, the displays of mobile terminals are normally small to give priority to portability and there has been a problem that the displayed document images are hard to read.

Most of such mobile terminals adopt a standard called QVGA with resolution of 320×240 pixels for their displays. However, for example, the size of an A4-size document image is around 3500×2500 pixels. If such document image data, for example, of a document shown in FIG. 15 is transmitted to a mobile terminal and the entire image is displayed as is on the terminal, the display size is reduced as shown in FIG. 29A. As a result, the characters in the image are blurred and become unreadable. If the display size of the image is increased to make the characters readable as shown in FIGS. 29B and 29C, a user must repeat vertical and horizontal scrolling many times to understand the entire contents.

SUMMARY OF THE INVENTION

The present invention provides a document processing apparatus and method that substantially obviate one or more problems caused by the limitations and disadvantages of the related art.

A preferred embodiment of the present invention may particularly provide a document processing apparatus and a document processing method for displaying a document having layout information in a display mode suitable for a screen, for example, on a mobile terminal.

According to one aspect of the present invention, a document processing apparatus includes a layout analysis unit which extracts document elements by analyzing data of a document, determines relationship between the document elements, extracts a group of mutually related document elements as an object and an independent document element as an object, and generates structure information defining one or more of the objects in the document; and a structure converting unit which converts the structure information generated by the layout analysis unit into display information for display in a display mode. The document processing apparatus may also include an object extracting unit which extracts, from the document, actual data of the objects extracted by the layout analysis unit.

The structure information may include attributes of the objects and reading order of the objects.

According to another aspect of the present invention, a document processing method includes a layout analysis step of extracting document elements by analyzing data of a document, determining relationship between the document elements, extracting a group of mutually related document elements as an object and an independent document element as an object, and generating structure information defining one or more of the objects in the document; and a structure converting step of converting the structure information generated by the layout analysis unit into display information for display in a display mode.

An image processing apparatus or method according to an embodiment of the present invention includes a unit or step which analyzes the layout of a document to extract objects and generates structure information, and a unit or step which converts the generated structure information into display information that can be displayed in a desired display mode, making it possible to display the document contents in a display mode that is clear and suitable for a small screen, for example, on a mobile terminal. In such an image processing apparatus or method, each group of mutually related document elements, or more specifically mutually related document elements the layout of which should preferably be maintained, are extracted as a single object. Therefore, even if the structure of a document is converted into a structure with which the objects of the document can be displayed one by one, interpretation of the document contents may not be affected. Also, according to embodiments of the present invention, document elements, for example an image and corresponding text or text and its heading, which are so closely related that separating them into different objects may make their relationship unclear can be combined and extracted as a single object. According to another aspect of the present invention, mutually related objects can be further combined into a superior object. With such superior objects, it is possible to convert structure information of a document into display information with which objects such as Title and Heading in the superior objects can be listed, and, when one of the Title/Heading objects is specified, corresponding Text or Image object is displayed in a large size. According to still another aspect of the present invention, change of layout of objects which may affect interpretation of document contents may be prevented. An image processing apparatus or method according to an embodiment of the present invention may be implemented by using a computer (a PC or the like), a microcomputer incorporated in any apparatus, or the like.

BRIEF DESCRIPTION OF THE DRAWINGS

FIG. 2 is a block diagram illustrating an exemplary functional configuration of a document processing apparatus of an embodiment of the present invention incorporated in a document server, a file server, or the like;

FIG. 3 is a block diagram illustrating an exemplary functional configuration of a document processing apparatus of an embodiment of the present invention incorporated in an ASP server or the like;

FIG. 5 is a flowchart illustrating an exemplary process in a document processing apparatus of an embodiment of the present invention;

FIG. 6 is a drawing of a sample document used for description;

FIG. 11 is a drawing illustrating an SVG document to display the animation shown in FIG. 10;

FIG. 13 is a drawing illustrating a SVG document for the interactive display shown in FIG. 12;

FIG. 15 is a drawing of a sample document used for description;

FIG. 25 is a drawing illustrating superior objects extracted from the document shown in FIG. 15;

DETAILED DESCRIPTION OF THE PREFERRED EMBODIMENTS

In the following, embodiments of the present invention are described in detail with reference to accompanying drawings.

Figure 1:
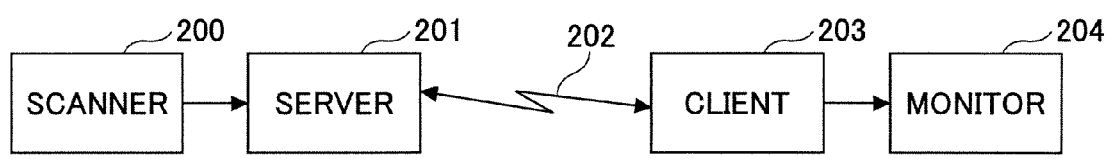
FIG. 1 is a block diagram illustrating a system used to describe an embodiment of the present invention.

FIG. 1 is a block diagram illustrating a system used to describe an embodiment of the present invention. In FIG. 1, 201 is a server representing an embodiment of the present invention. A scanner 200 reads a document as bitmap data and inputs the data into the server 201. A client 203 uses a monitor 204 to display images. A transmission path 202 may be the Internet or a LAN connecting the server 201 and the client 203. In the following, a mobile terminal, such as a mobile phone or a PDA, having a screen (the monitor 204) is used as an example of the client 203. An embodiment of the present invention may be useful in a system where such a mobile terminal is used as the client 203. However, the present invention is useful for any apparatus having a display screen in which it is desired or necessary to make images legible or more legible, for example by enlargement.

Figure 2:
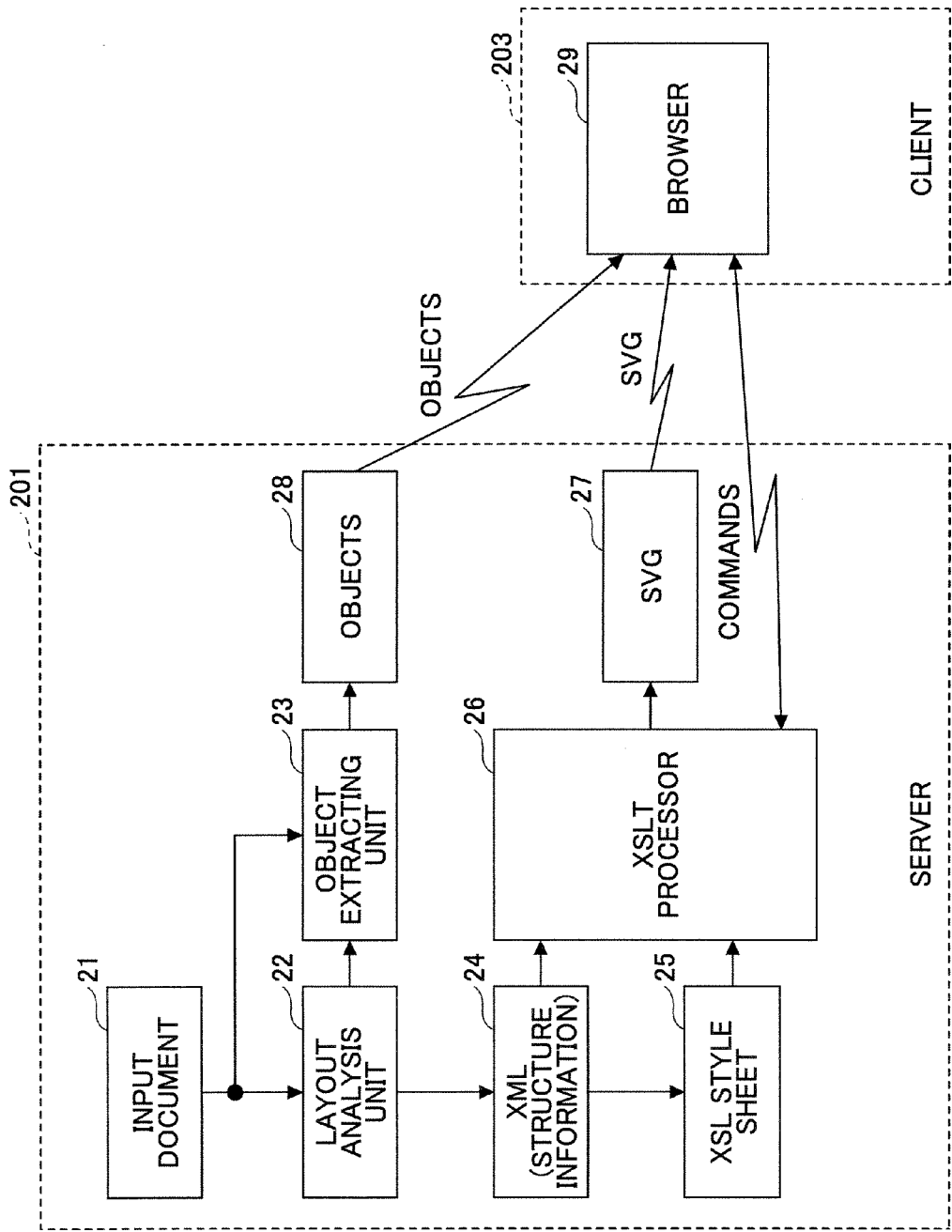
Figure 3:
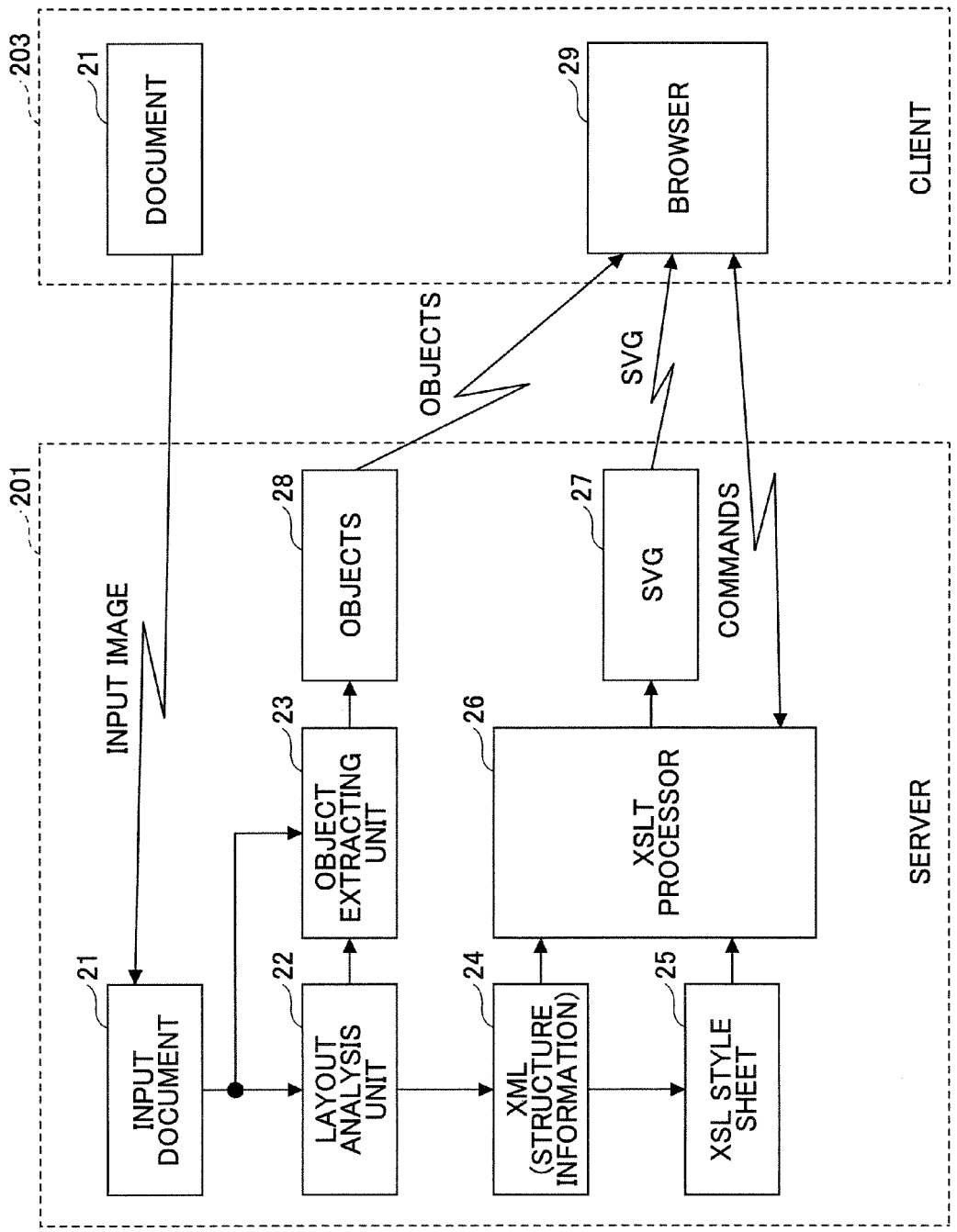

The server 201 includes, in addition to the functional units shown in FIGS. 2 and 3 which constitute a document processing apparatus of an embodiment of the present invention, an interface (not shown) with the scanner 200, a unit (not shown) to send/receive commands and data to/from the client 203 via a network, and units such as a data storage unit which implement general functions of a server.

FIGS. 2 and 3 are block diagrams illustrating the functional configuration of a document processing apparatus of an embodiment of the present invention. As shown in FIGS. 2 and 3, a document processing apparatus of an embodiment of the present invention includes a layout analysis unit 22 which analyzes the layout of a document 21, extracts objects in the document 21, and generates structure information 24 of the document 21; an object extracting unit 23 which cuts out the actual data of the objects extracted by the layout analysis unit 22 and saves data corresponding to each object as a separate image file 28 (this file may also be called an object); and a structure converting unit 26 which converts the structure information 24 generated by the layout analysis unit 22 into structure information suitable for a desired document display mode and generates a conversion result 27.

Figure 4:
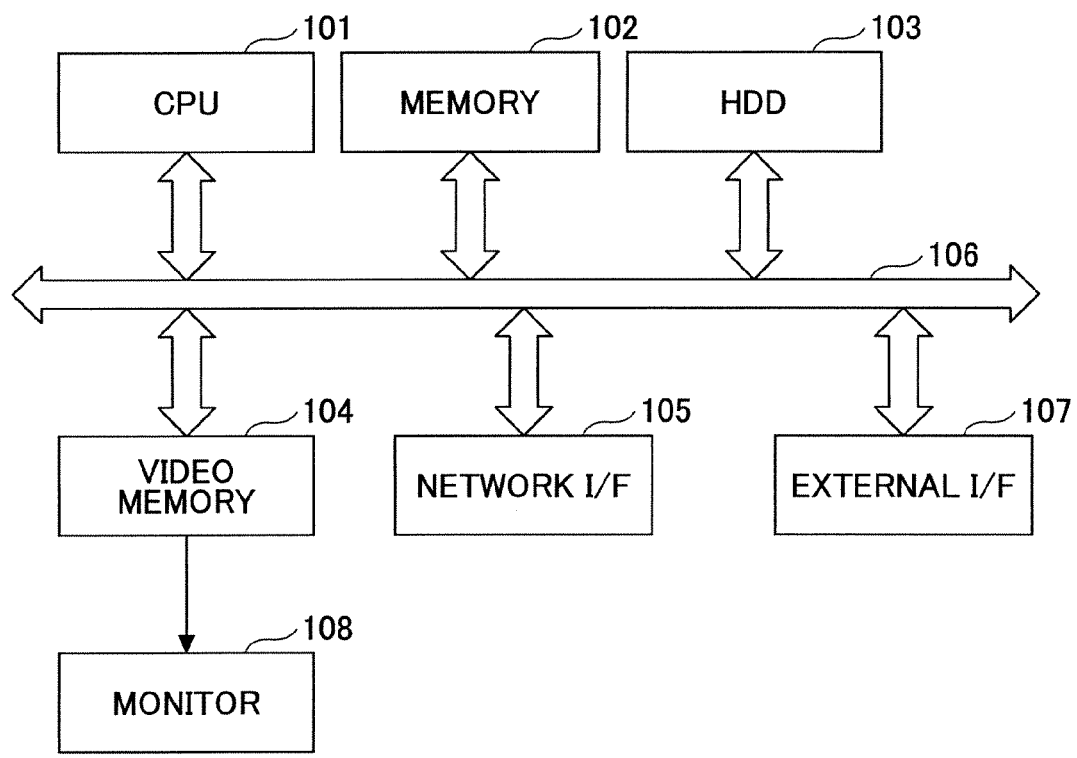
FIG. 4 is a block diagram illustrating an example configuration of a computer to implement a document processing apparatus of an embodiment of the present invention by using programs.

The server 201 may be implemented by programs running on a computer as shown in FIG. 4. As mentioned above, a mobile terminal is used as an example of the client 203 in the discussion below. The internal configuration of the mobile terminal is essentially the same as that of a computer and programs are used to achieve the functions required for the client 203.

In the exemplary embodiment of FIG. 4, a CPU 101 performs operations according to programs, a non-volatile memory 102 is used as a work area for temporarily storing data such as program codes and coded data of images, a hard disk (HDD) 103 stores data and programs, and a video memory 104 is used as a temporary memory to which display data for a monitor 108 is loaded. The display data loaded into the video memory 104 is accessed at regular intervals and displayed on the monitor 108. A network interface 105 is used to send/receive data via the Internet or a LAN, for example; an external interface 107 is an interface with local I/O devices such as a scanner; and a bus 106 is used to connect the above mentioned elements. Generally, a computer may also include input devices such as a mouse and a keyboard for entering user instructions, a drive for reading/writing data from/onto an information recording medium such as an optical disk, and so on. Those devices are not shown in FIG. 4 for simplification.

Programs used to implement the functional units 22, 23, and 26 shown in FIGS. 2 and 3 are, for example, read from an information recording medium such as an optical disk or received via a network, stored in the hard disk 103, loaded into the memory 102, and executed by the CPU 101. The present invention also relates to a computer-readable information recording medium containing such programs. In the description below, it is assumed that the server 201 and the client 203 are implemented by using computers described above.

The method of inputting the document 21 and the data format of the document 21 are described below. The document 21 may be input as bitmap data by using the scanner 200 connected to the server 201. The document 21 may also be received as electronic data from a client via a network. Electronic data may be a PDF file, bitmap data compressed by using JPEG or JPEG 2000 format, data created by proprietary applications such as MS-Word (registered trademark) or MS-Excel (registered trademark), or data in PostScript (registered trademark) or other page description languages (PDL).

The server 201 as shown in FIG. 2 is intended to be used as a document server or a file server which is capable of storing many documents and delivering documents according to the requests from the client 203. The input documents are sequentially stored in the hard disk of the server 201 and recorded in a database. The documents may be either stored in their original formats (data in various formats, for example, JPEG-compressed image data and PDF data coexist in the same server) or stored in a unified format (for example, the JPEG format) through conversion. Also, several formats may be used depending on input methods. For example, bitmap image data may be converted into JPEG-compressed image data, and electronic data created by proprietary applications may be converted into the PDF format.

The server 201 as shown in FIG. 3 is intended to be used as an application service provider (ASP) server which provides a document structure conversion service for the client 203. In this case, a document (electronic data) is sent from the client to the server 201 and its structure is converted, then the result is sent to the client (or another client). The documents input into the server are stored temporarily in a memory or a hard disk until the processing is completed. Therefore, creation of a database is not necessary. In FIG. 3, the client 203 sends a document to the server 201 and, after the structure is converted, the result is returned to the same client 203.

FIG. 5 is a flowchart illustrating the processes of the document processing apparatus (or the server 201) of an embodiment of the present invention. When the server 201 is used as a document server or a file server, the server may also be configured to perform processes in steps S101 and S102 in advance when input documents are recorded in the database; to store the structure information and objects (actual data); and to perform step S103, when a document is requested from the client 203, by using the stored structure information of the requested document. Such a server configuration has an advantage of being able to reduce the load of the server 201 and reduce the response time for a request. When the server 201 is used as an ASP server, processes in steps S101 through S103 are performed when document processing is requested. Processes shown in FIG. 5 are described below with reference to FIGS. 2 and 3.

In step 101, the layout of the document 21 is analyzed by the layout analysis unit 22. In the layout analysis, the layout analysis unit 202 extracts document elements (character areas and non-character areas); determines relationship between the document elements; extracts each group of mutually related document elements as a single object and each independent document element as a single object; identifies the logical attribute (heading, title, or the like), physical attribute (character, photo, or the like), and reading order of the objects; and generates and stores structure information 24 including layout information of the objects, attributes of the objects, and reading order of the objects. The structure information 24 may be created in any format. In this embodiment, the extensible Markup Language (XML) is used as an example of its format. Processes in layout analysis are described later in detail.

In step S102, an object extracting unit 23 cuts out from the document 21 the actual data of the objects extracted in the layout analysis and saves data corresponding to each object as a separate image file (this file may also be called an object). Each object may preferably be compressed for storage. For this compression, known compression formats such as JPEG, JPEG2000, GIF, PING, and TIFF may be used. Step S102 may also be configured to compress the objects after performing additional processing on each object according to its attributes. For example, character objects may be binarized and then compressed by using MMR or MR, or converted into vector data such as a SVG file (SVG is described later).

In step S103, the structure converting unit 26 converts the structure information 24 generated by analyzing the document 21 into structure information which enables the document 21 to be displayed in a display mode suitable for the client 203 to which the document is sent. In this embodiment, an XSLT processor, which is an engine for converting an XML document into an XML document having a different style, an HTML document, or a scalable vector graphics (SVG) (this conversion process is called XSL transformation or XSLT), is used as an example of the structure converting unit 26. The XSLT processor 26 selects a style sheet corresponding to a display mode suitable for the target client 203 from prepared style sheets 25 written in the extensible Stylesheet Language (XSL) and uses the style sheet for structure conversion. In this embodiment, the conversion result 27 is generated in the SVG format. SVG is a vector graphics language using XML and advocated by the World Wide Web Consortium (W3C) as a standard language for vector graphics on the Internet. SVG has various functions to display, for example, animations, interactive graphics able to respond user operations with a mouse, overlapping objects, and image data such as a vector image, PNG image, and a JPEG image embedded by using hyperlinks. Therefore, SVG is an example of one of the formats suitable for the present invention.

Step S104 is performed using functions which are typically equipped in a server. Step S104 sends the conversion result 27 (converted structure information) and objects (actual data) 28 to the client 203 which has made the request. The client 203 is equipped with a browser 29 supporting SVG and is able to display the contents of document 21 in a suitable display mode based on the conversion result 27 (a SVG document) and the objects 28. Depending on the display mode, all the objects (actual data) 28 extracted from the document 28 are sent in a batch to the client 203 or only the objects 28 requested from the browser 29 are sent to the client 203.

In the following, by using a sample document shown in FIG. 6, layout analysis, structure information and its conversion, and display modes of the converted document are described.

Figure 7:
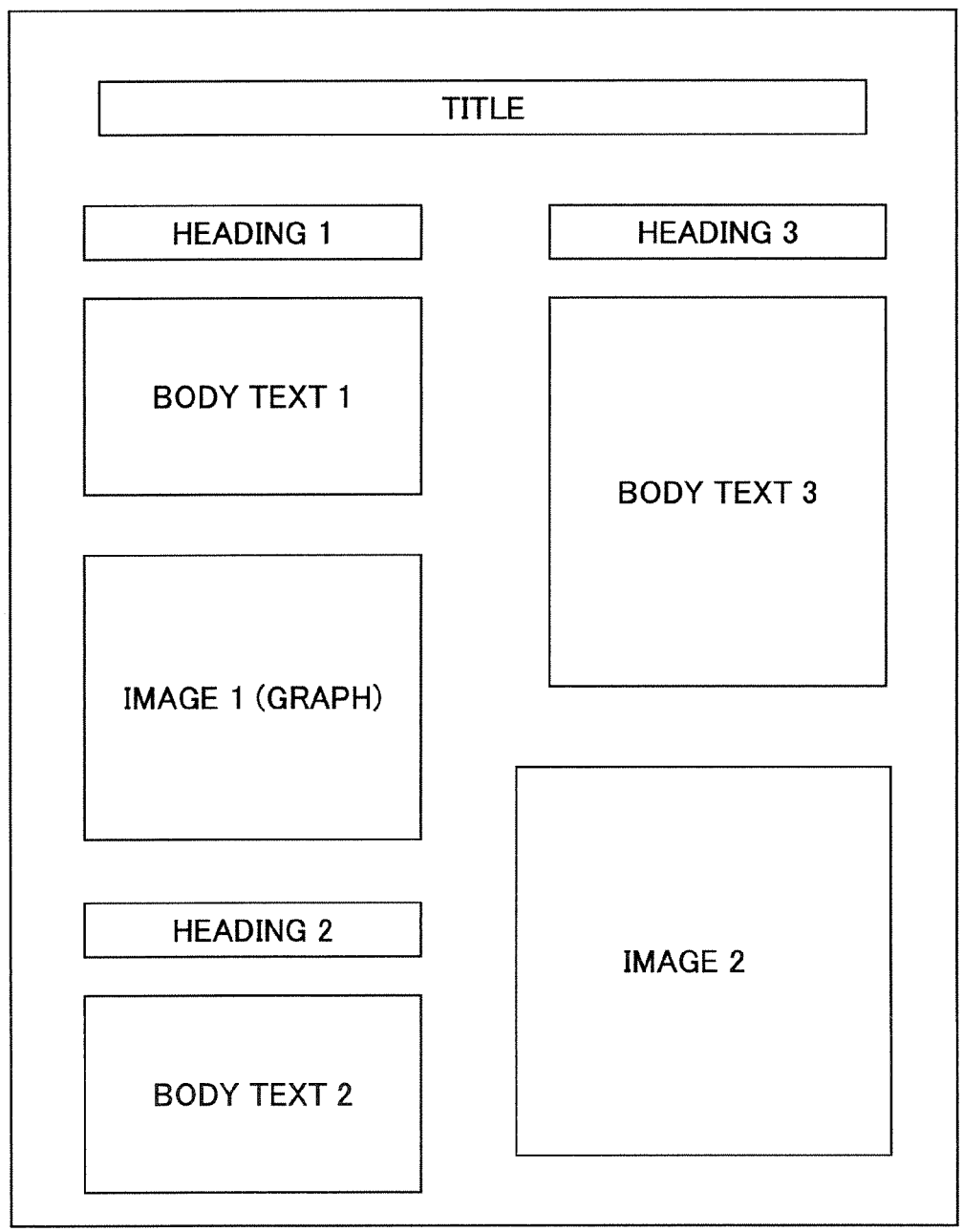
FIG. 7 is a drawing illustrating examples of objects extracted from the document shown in FIG. 6.
Figure 8:
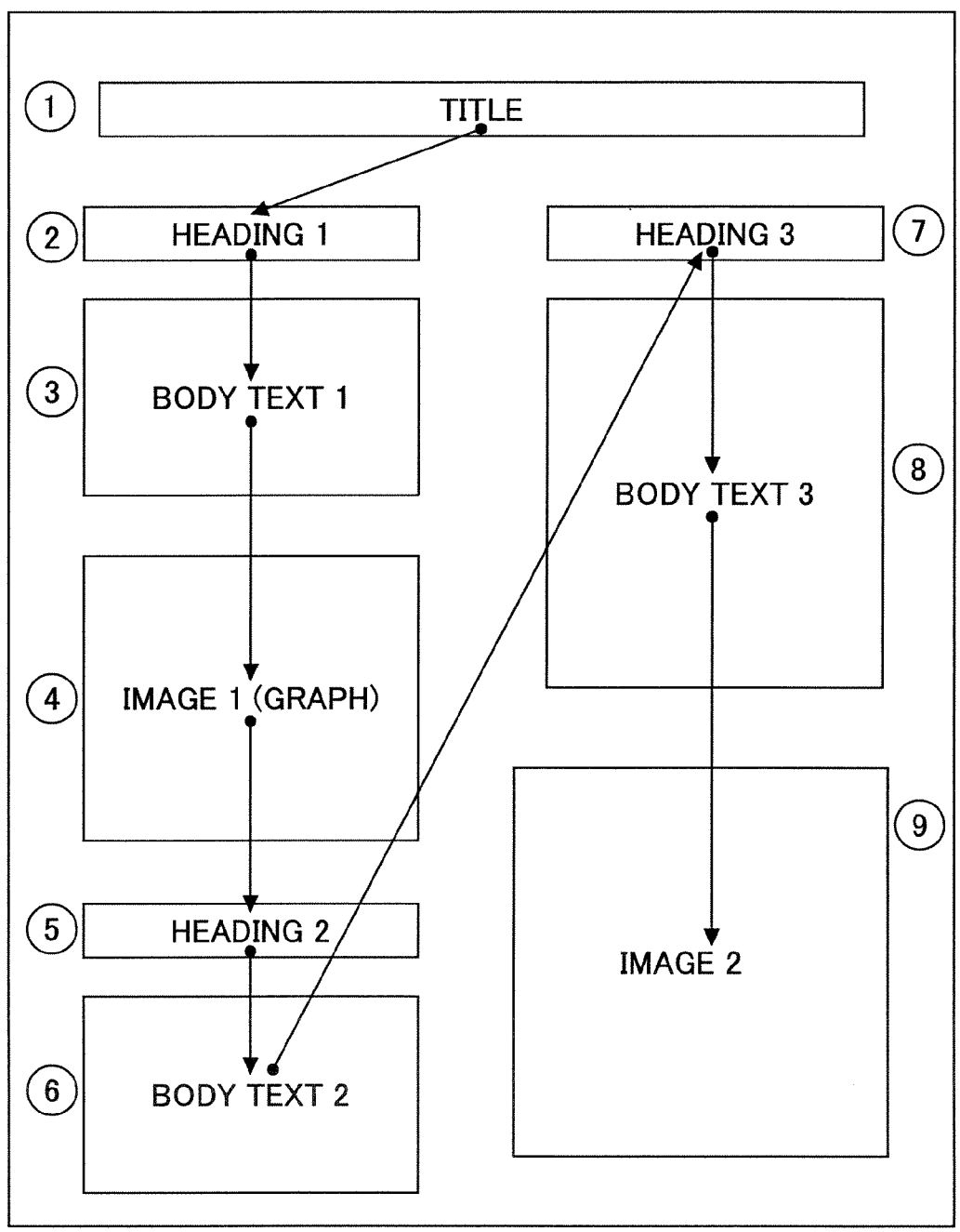
FIG. 8 is a drawing illustrating the reading order of the objects shown in FIG. 7.

As a result of analyzing the layout of the document shown in FIG. 6, areas shown as rectangles in FIG. 7 are extracted as objects, and their attributes (heading, title, character/image, or the like) are identified. Also, as shown in FIG. 8 by the arrows, the reading order of the objects is identified. In the case of a pdf file or similar electronic data, graphs are drawn by using graphics commands and can be distinguished from images. Therefore, the layout analysis process may be configured to distinguish between graphs and images.

Figure 9:
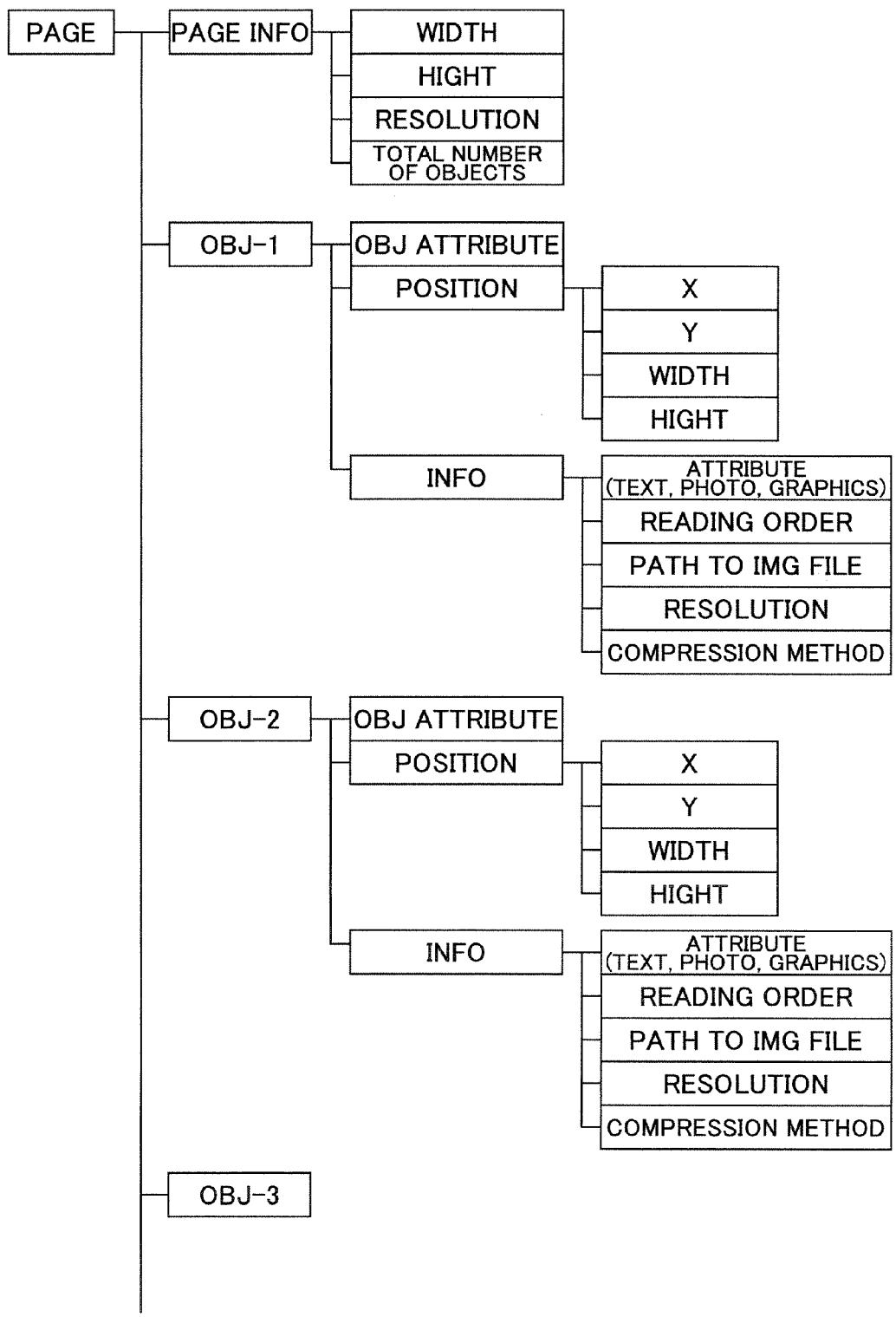
FIG. 9 is a block diagram illustrating an example of a description format of structure information generated by layout analysis.

The structure information generated in layout analysis may be written in XML as a hierarchical tree structure as shown in FIG. 9. The hierarchical tree structure is described below in brief. "Page Info" at the top of the tree includes the page size (width and height), resolution, and the total number of objects in a document. On the same level as "Page Info", information on objects ("OBJ-1", "OBJ-2", "OBJ-3", and so on) is described. Information on each object includes "OBJ Attribute", "Position", and "Info". "OBJ Attribute" includes the logical attribute such as "Title" or "Heading" of the object. "Position" includes the coordinates (x, y) of the object in the page and the rectangular size (width, height) of the object. "Info" includes the physical attribute or the type (text, photo, graphics, or the like) of the object, the reading order (nth from the top), the path to the object data (image file), the resolution, and the compression method.

Figure 10:
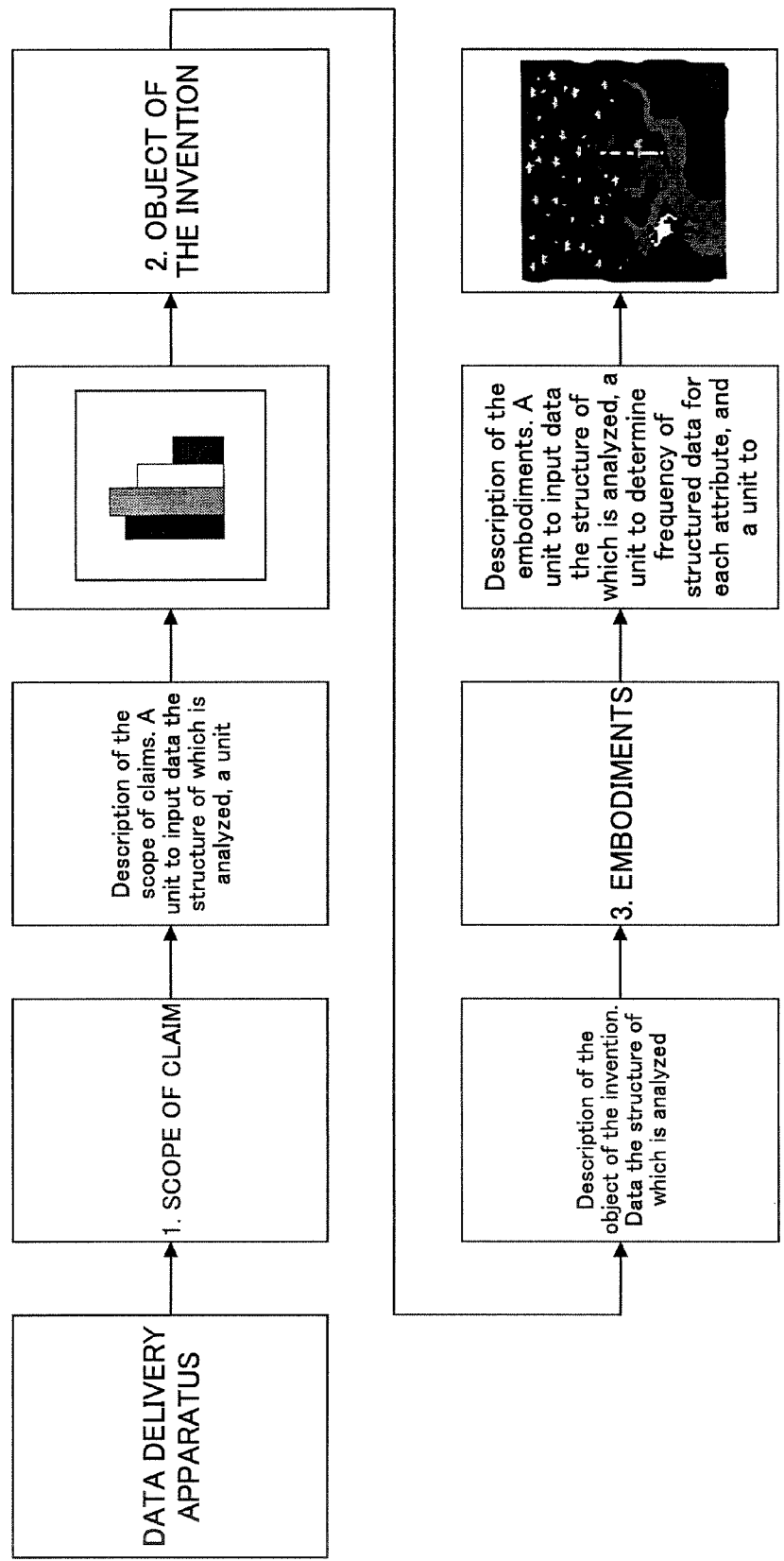
FIG. 10 is a drawing illustrating an example of an animation in which objects in the document shown in FIG. 6 are displayed one by one.

FIG. 10 is a drawing illustrating an example of an animation in which objects in the document shown in FIG. 6 are displayed one by one in the reading order. FIG. 11 is a drawing illustrating a result (SVG document) of converting the structure information to display the animation shown in FIG. 10. In FIG. 11, P-WIDTH and P-HEIGHT in line (1) represent the page size of a document. In lines (2), (4), and (5), objects are specified from the top in the reading order. WIDTH and HEIGHT in line (2) represent the size of the first object in the reading order, and OBJ represents the address of the object data. Line (3) indicates that the state of the object becomes "visible" from "hidden" after 1 second (begin="1 s") and after 3 seconds (dur="3 s") its display is terminated (fill="remove"). Lines (4) and (5) give essentially the same instructions except that their starting times (begin) are different, thereby displaying the animation of objects as shown in FIG. 10. Such an animation makes it easier to view a document even if the display screen on which the document is shown is relatively smaller than the document. The structure of a document may also be converted so that users turn the pages by using the browser 29 instead of automatically switching the objects (pages).

Figure 12:
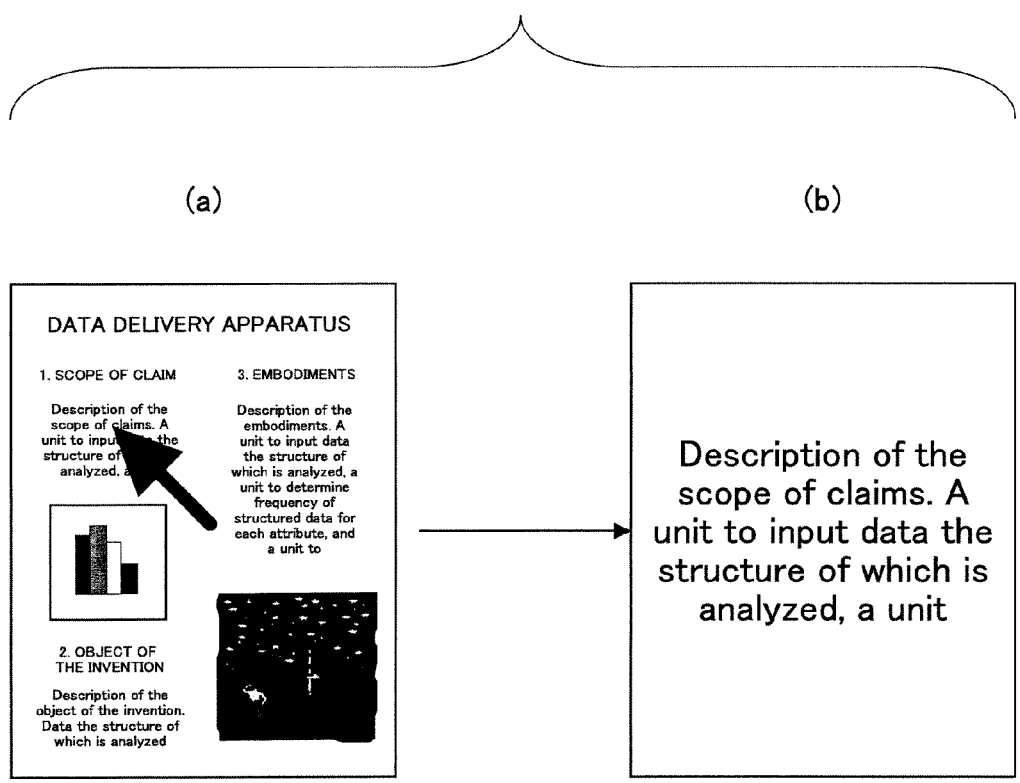
FIG. 12 is a drawing illustrating an example of interactively displaying one of the objects shown in FIG. 6.

FIG. 12 shows another display mode in which the objects in a document are displayed in a layout having a size relatively smaller than the size of the document as shown in FIG. 12 (a) and the user is allowed to specify any one of the objects by using the browser 29 to enlarge the object as shown in FIG. 12 (b). In this display mode, users are allowed to both grasp the layout of a document and read the characters even with a screen that is relatively smaller than the document. FIG. 13 is a drawing illustrating a result (an SVG document) of converting the structure information for the interactive display as shown in FIG. 12.

Figure 14:
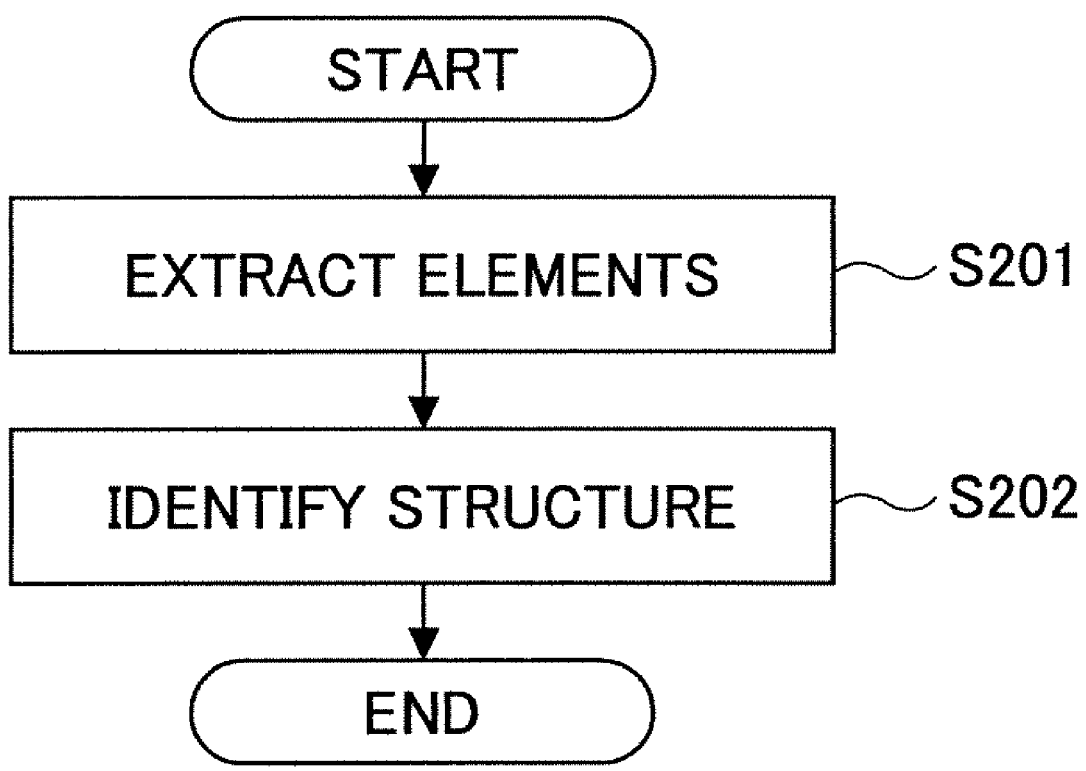
FIG. 14 is a flowchart illustrating an exemplary process in step S101 shown in FIG. 5 of a first embodiment of the present invention.

In the following, the layout analysis (step S101 shown in FIG. 5) is described in detail. The layout analysis includes step S201 of extracting document elements and step S202 of identifying the document structure as shown in FIG. 14.

In step S201, document elements (character areas and non-character areas) are extracted from a document. When the document is provided as electronic data, characters are represented by fonts and their coordinates and can be easily distinguished from bitmap images. Also, since coordinate information is contained in the data, the rectangular areas and the attributes of elements can be extracted very easily.

On the other hand, when the entire document is provided as bitmap data such as scanned data, an area identification process such as that often seen in the preprocessing for OCR processing is performed. For this area identification, a method disclosed in patent document 4 which identifies the background color of a document image, generates connected components by combining pixels having colors other than the background color, and classifies the connected components into character areas and graphics/photo areas based on at least shape characteristics may be used. Also, a method shown in patent document 5 which extracts circumscribed rectangles of connected components of pixels other than those of the background color from an OR-compressed document image, classifies the circumscribed rectangles into characters and others based on their shapes and internal data, and extracts the character areas by assembling the circumscribed rectangles may be used.

Figure 16:
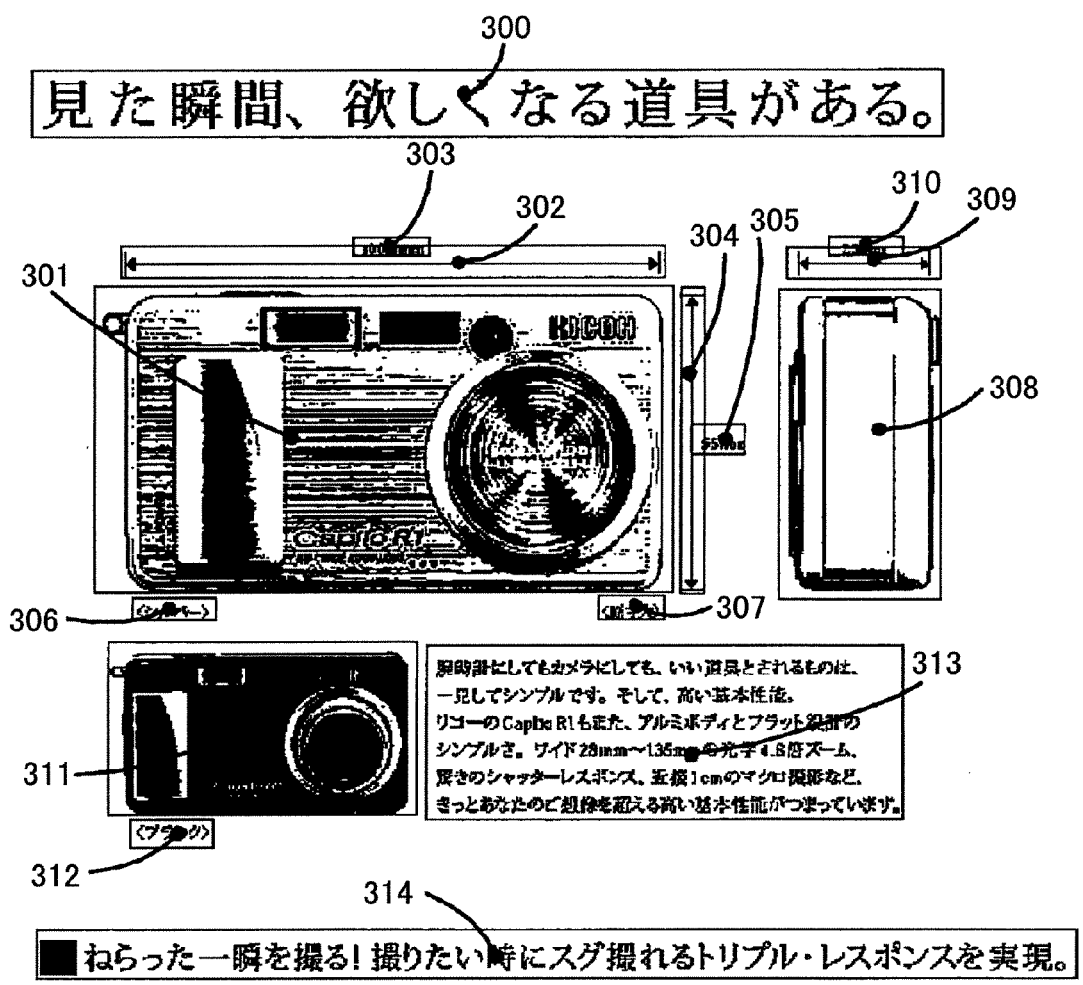
FIG. 16 is a drawing illustrating document elements extracted from the document shown in FIG. 15.

FIG. 16 is a drawing illustrating an example of elements extracted from the upper half of the document shown in FIG.

Figure 17:
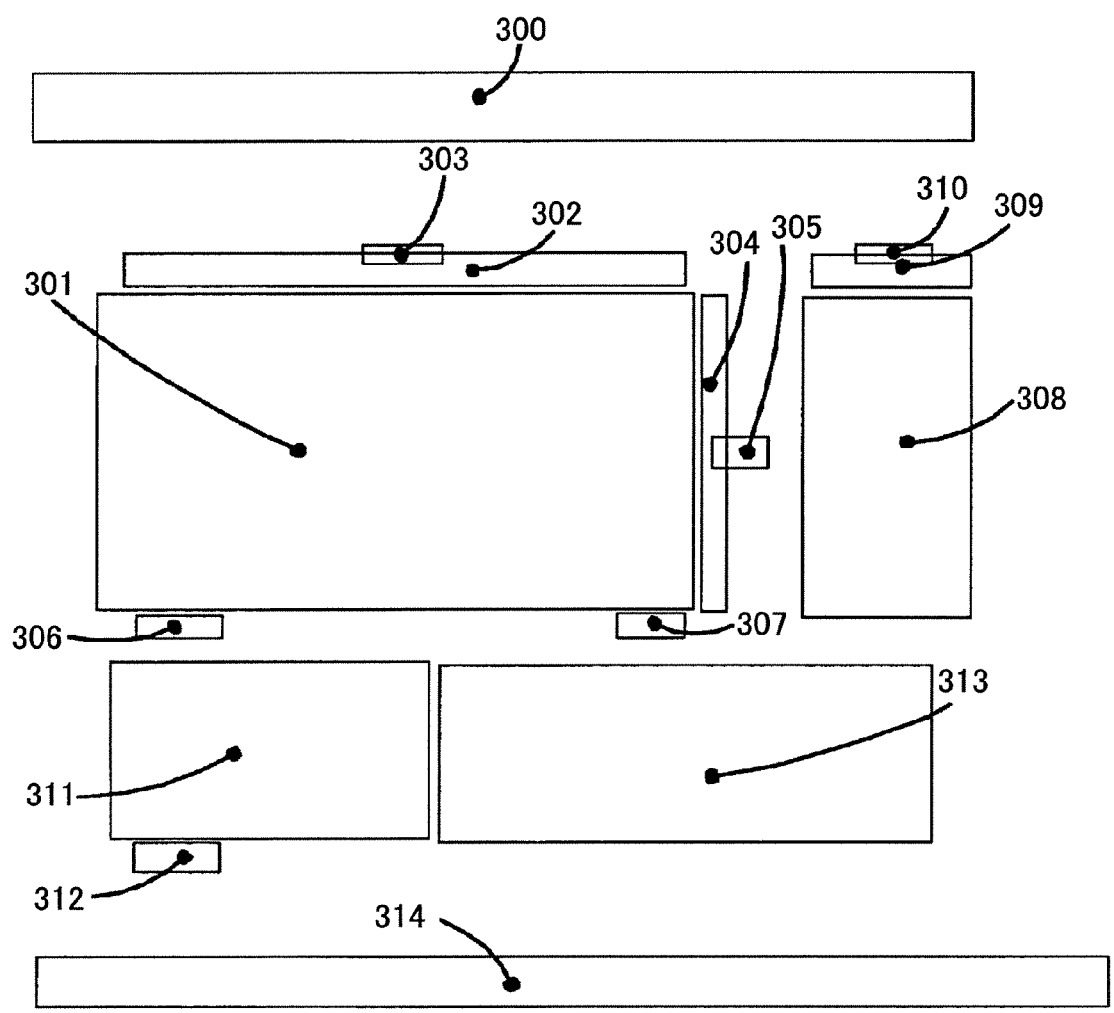
FIG. 17 is a drawing illustrating rectangles representing the document elements shown in FIG. 16.

15. In FIG. 16, elements 300 through 314 are the extracted document elements. FIG. 17 shows the rectangles representing the extracted document elements.

If the document elements are extracted as objects without any change and the document is delivered after structure conversion, the relationship between, for example, the element 301 (image of a camera), the element 302 (dimension line), and the element 303 (dimension value), or the meaning of each object, may not be conveyed correctly to the receiving client.

To avoid such a problem, the structure identification process in step S202 can be configured to determine relationship between the document elements, and to extract each group of mutually related document elements as a single object and each independent document element as a single object. In the following, the structure identification processes in two embodiments are described.

1. First Embodiment

Figure 18:
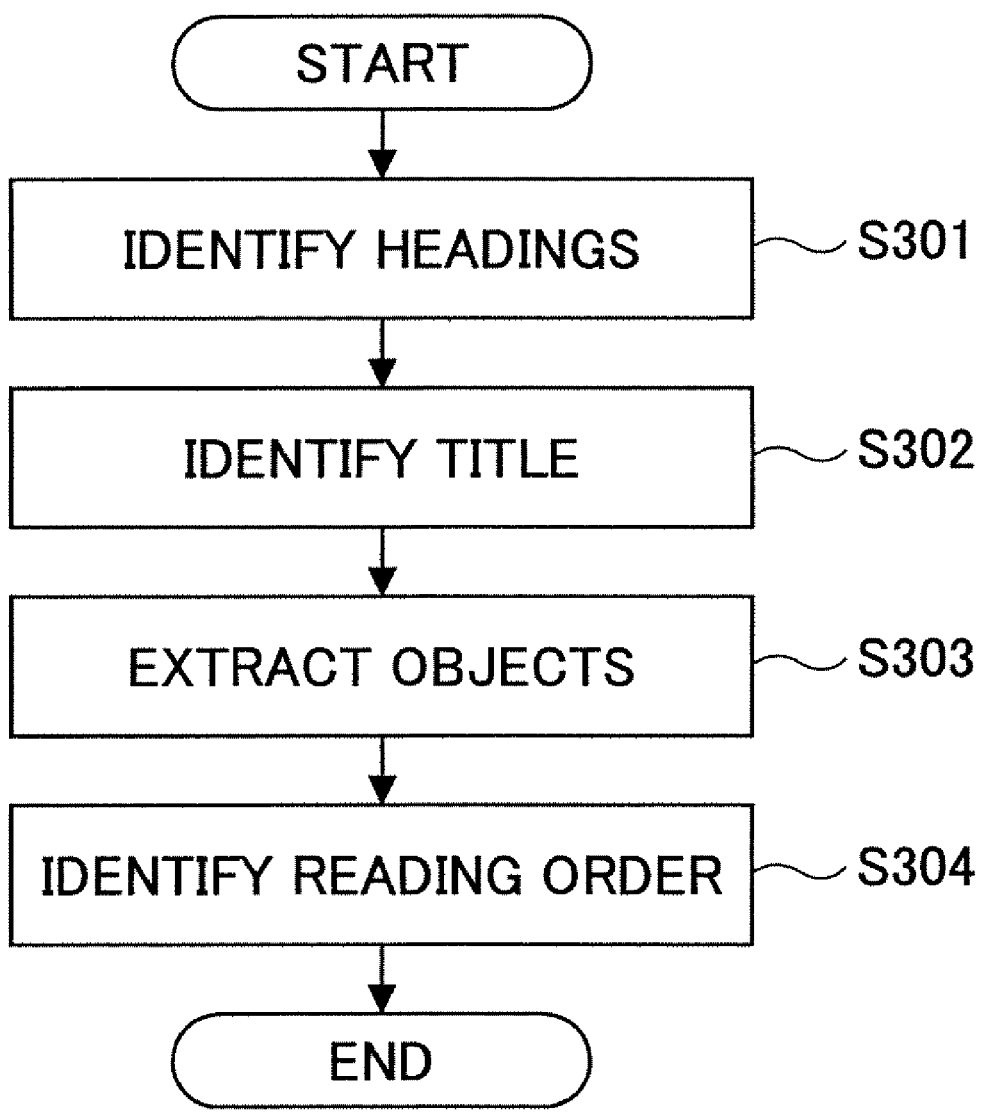
FIG. 18 is a flowchart illustrating an exemplary process in step S202 shown in FIG. 14.

FIG. 18 is a flowchart illustrating the structure identification process in the first embodiment of the present invention. In step S301, "Heading" elements in the document elements extracted by the elements extracting process (step S201 shown in FIG. 14) are identified based on information such as character size and the number of character lines. Note that there are documents without "Headings". In the subsequent step S302, "Title" element of the page in the "Heading" elements is identified. In general. "Title" is positioned near the top center of a page and its character size is larger than that of other elements. Therefore, "Title" can be identified based on information such as the position in a page and the character size. The process to identify headings and titles is briefly described below.

A character size may be identified by selecting a character in an element and measuring the height and width or the area. More preferably, a character size may be identified by using a method as shown in patent document 5 in which character rectangles in an element are combined and extracted as a rectangular area representing a character line, and the height of the character line (the length of the shorter side) is measured and used as the character size. If a document element includes multiple character lines, the greatest height may be used as the character size. The number of character lines in a document element can also be obtained by using a process similar to that described above.

For headings, a method in which an element is identified as a heading when the element satisfies multiple conditions at the same time may be used. The following are examples of such conditions:

The element consists of one or two character lines and the character size is large.
The character pitch of the character line in the element is different from that of the body text.
The element is at the top of or separated from the body text.

Other methods for identifying headings and titles are also described in patent document 3.

After the headings and the title are identified, the process in step S303 extracts multiple document elements with a certain relationship (for which the relationship in the layout is preferably maintained) as a single object by combining document elements; or extracts a single document element with no relationship with others as an object. In the exemplary embodiment, this process is performed for every document element in the page. (The process is described in more detail later.)

Figure 19:
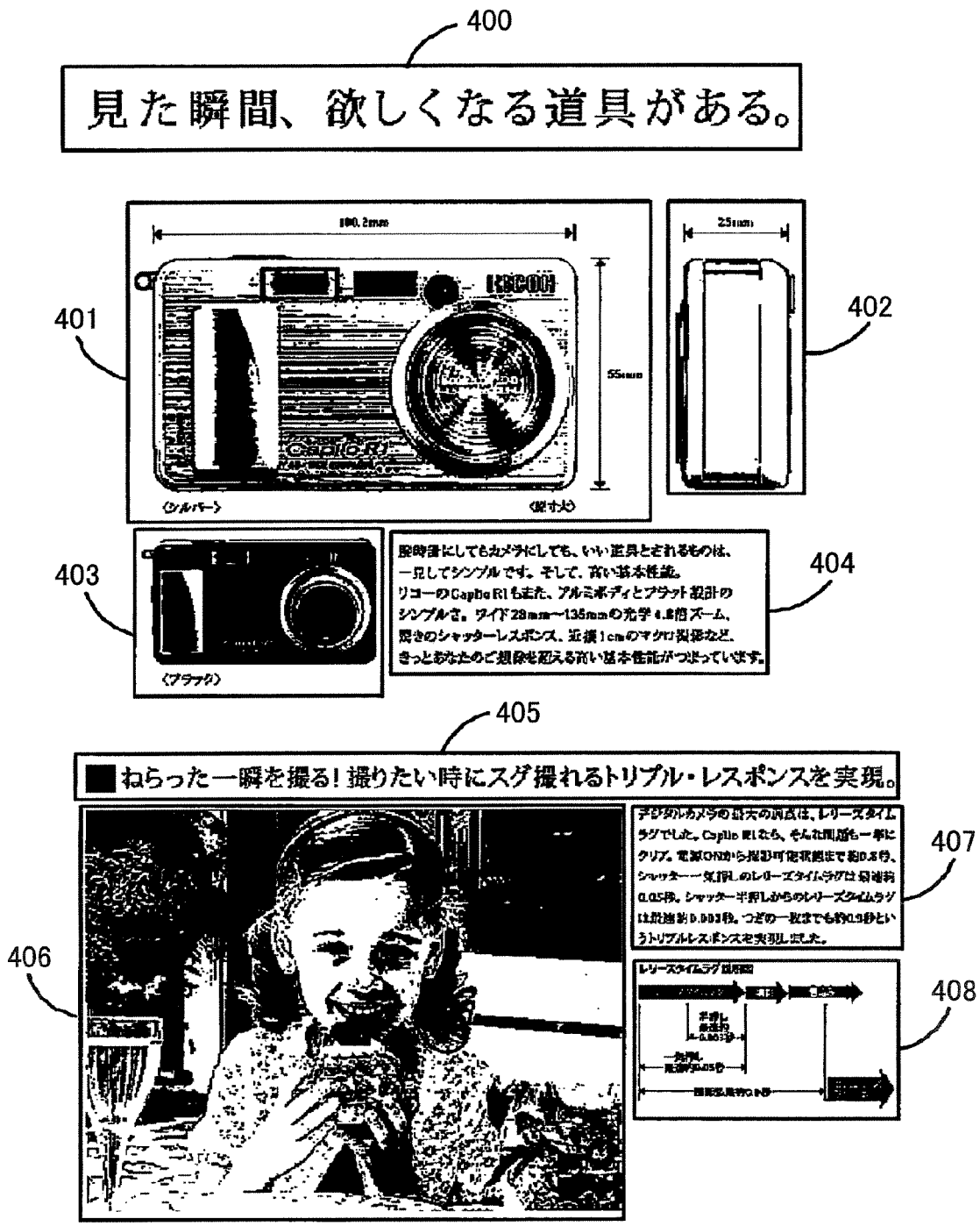
FIG. 19 is a drawing illustrating objects extracted from the document shown in FIG. 15.

FIG. 19 is a drawing illustrating objects extracted from the document shown in FIG. 15 through steps S301 through S303. In FIG. 19, objects 400 through 408 represent the extracted objects. In comparison with FIG. 17, the elements 301 through 307 are combined into the object 401, the elements 308 through 310 are combined into the object 402, and the elements 311 and 312 are combined into the object 403.

In the subsequent step S304, the reading order of the extracted objects is identified. For a horizontally written document, the reading order is identified basically by searching for objects from top to bottom and left to right, taking the column setting into consideration. For example, for the horizontally written document shown in FIG. 6, the objects in the left column are searched for from top to bottom, and then the objects in the right column are searched for. That the document has two columns can be identified based on for example the fact that the objects on the left and right have approximately the same width.

The reading orders in most documents may be identified as described above. However, for a document having a complex layout as shown in FIG. 19, a more detailed procedure is preferred to identify the reading order. In the description below, the reading order of the objects shown in FIG. 19 is examined in the order of the numbers assigned to those objects.

In the illustrated embodiment, determining the object to be read after the object 401 showing the front view of a camera may be the most difficult. For example, the next object may be determined by using the following procedure:

An object which is the leftmost object adjacent to and below the object 401 is searched for (the object 403 is obtained).
At the same time, an object which is on the right of and adjacent to the object 401 is searched for (the object 402 is obtained).
The reading order is determined based on the positional relationship between the objects 402 and 403 and the object 401. In this example, the leftmost x-coordinates and widths of the objects 401 and 403 are compared. Also, the top y-coordinates and heights of the objects 401 and 402 are compared.
If the objects 401 and 403 have approximately the same width (and their leftmost x-coordinates are also approximately the same), the object 403 is identified as the next object to be read. In this example, however, since their widths are different and the height of the object 402 is smaller than that of the object 401, the object 402 is identified as the next object to be read. Also, if the height of the object 402 is, for example, substantially greater than that of the object 401, the object 403 is identified as the next object to be read.

Figure 20:
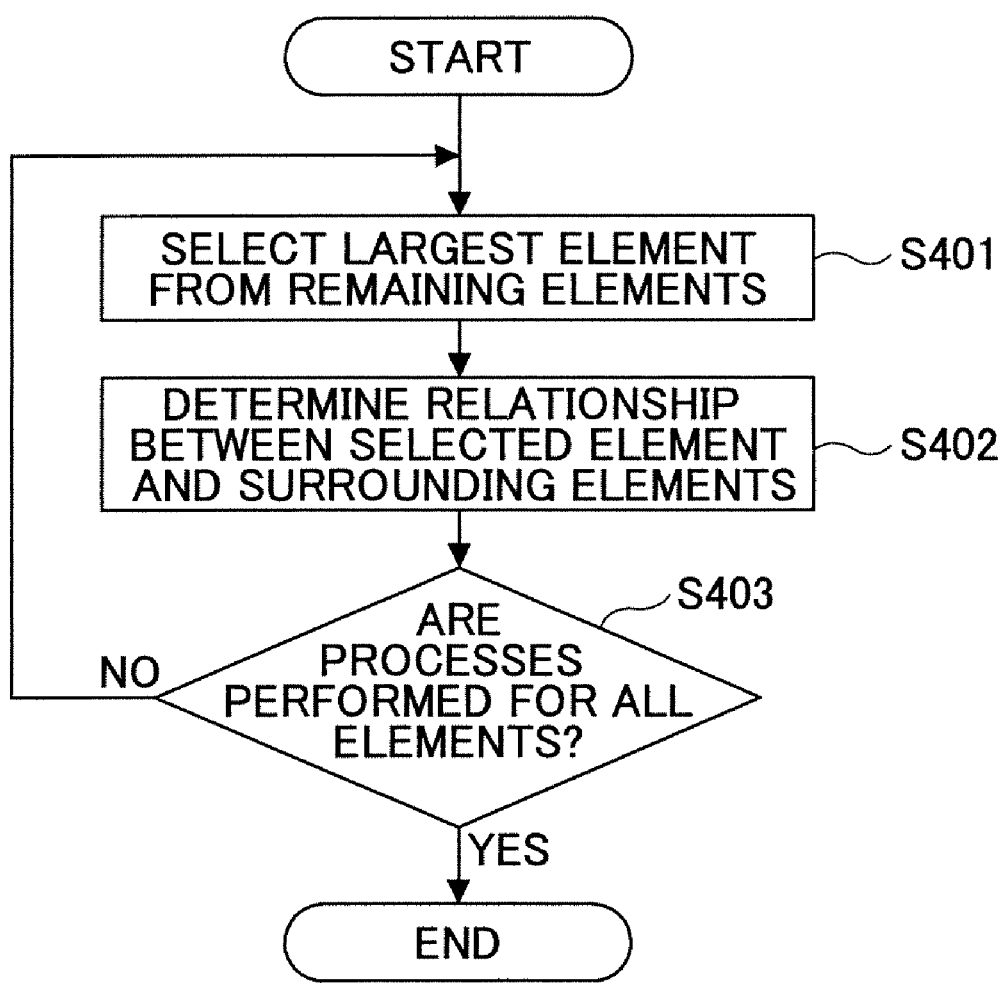
FIG. 20 is a flowchart illustrating an exemplary process in step S303 shown in FIG. 18.

FIG. 20 is a flowchart illustrating the object extracting process in step S303 shown in FIG. 18.

In step S401, a document element largest in size is selected as a base element from the remaining document elements (document elements which have not already been extracted as objects). To determine the size of a document element, both its width and its height are preferably taken into consideration. The sum of the width and height or the product of them (area) may also be used for this purpose.

In the subsequent step S402, the base element is extracted as an object and the relationship with other document elements around the base element is examined to determine whether those elements should be included into the same object. Then, the document elements identified as having relationship with the base element are incorporated into the same object. (This process is described in detail later.)

The above steps are repeated until it is determined in step S403 that all the document elements in a document are extracted as single-element objects or multiple-element objects.

Figure 21:
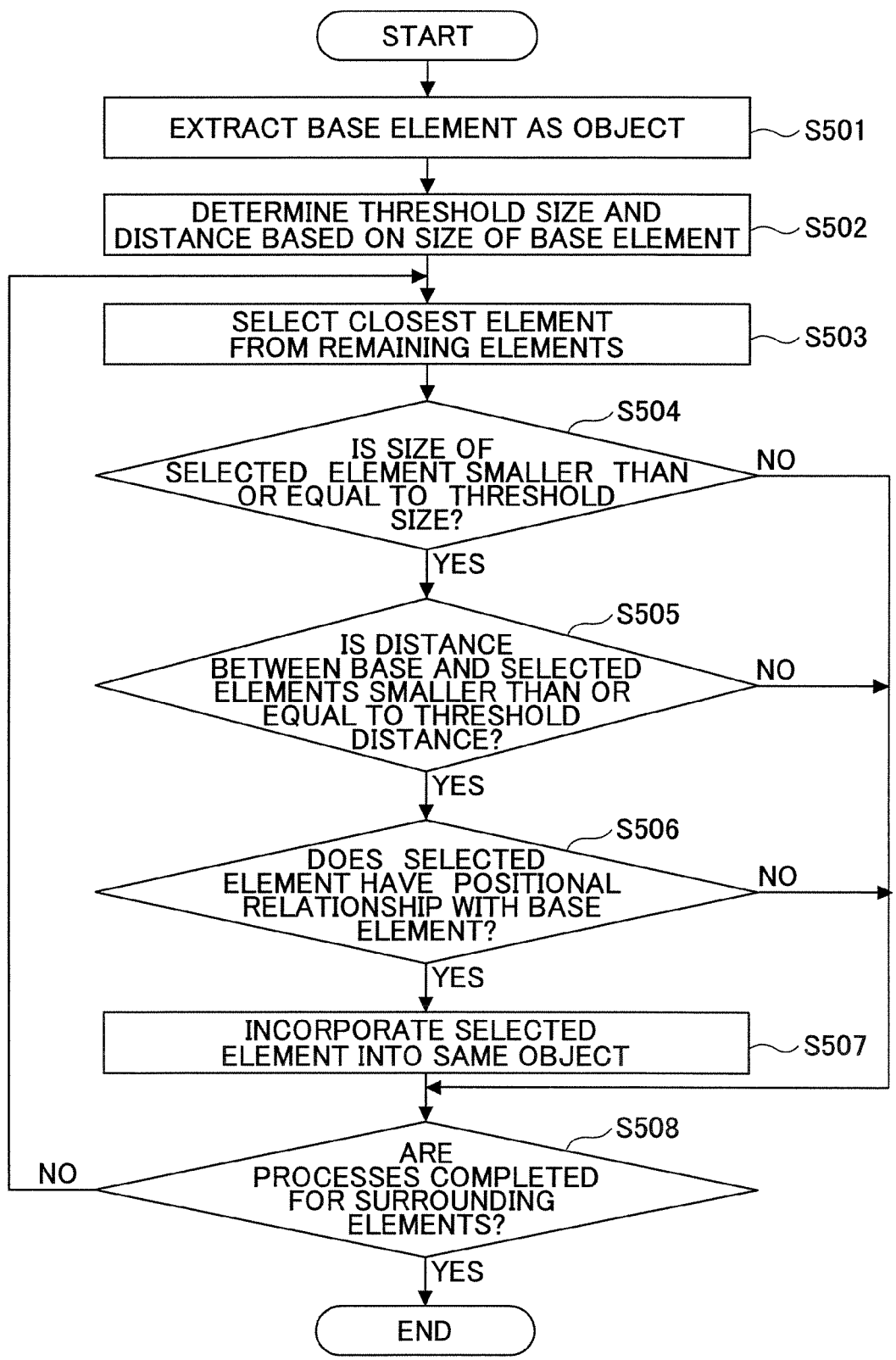
FIG. 21 is a flowchart illustrating an exemplary process in step S402 shown in FIG. 20.

FIG. 21 is a flowchart illustrating the process in step S402 shown in FIG. 20. First, a base element is extracted as an object (step S501). Next, based on the size of the base element, a threshold size and a threshold distance are determined (step S502). As mentioned above, for the size of the base element, both its width and its height are preferably taken into consideration. The sum of the width and height or the product of them (area) may also be used for the size of the base element.

From the remaining document elements around the base element, a closest document element is selected (step S503). If the selected element is determined as having a size smaller than or equal to the threshold size in step S504, the distance between the selected element and the base element is determined as being smaller than or equal to the threshold distance in step S505, and the selected element is determined as having a certain positional relationship with the base element in step S506, the selected element is incorporated into the same object as that of the base element in step S507.

In step S506, the two-dimensional relationship between the base and selected elements are examined. For example, if one of the following conditions (1), (2), and (3) is met, the two elements are determined as having a certain positional relationship.

(1) Either x-coordinates or y-coordinates of the centers of both elements are approximately the same.

(2) Either x-coordinates or y-coordinates of given corners of both elements are approximately the same.

(3) The x-coordinates between the leftmost coordinate and the rightmost coordinate of the selected element are within the range of the x-coordinates of the base element, or the y-coordinates between the top coordinate and the bottom coordinate of the selected element are within the range of the y-coordinates of the base element.

In the example document shown in FIG. 17, for example, when the element 301 is selected as a base element, the size of the element 303 is smaller than the threshold size and the distance is also smaller than the threshold distance (size and distance conditions are satisfied). In addition, since the x-coordinates of the centers of both elements are approximately the same (positional relationship condition is satisfied), condition (1) is satisfied. Therefore, the element 303 is incorporated into the same object as that of the base element 301. Also, the size of the element 306 is smaller than the threshold size and the distance is smaller than the threshold distance. Since the x-coordinates (between the leftmost coordinate and the rightmost coordinate) of the element 306 are within the range of the x-coordinates of the base element 301, condition (3) is satisfied. Therefore, the element 306 is also incorporated into the same object as that of the base element 301. In contrast, since the size (area) of the element 311 is greater than the threshold size, the element 311 is not incorporated into the same object as that of the base element.

Step S508 determines whether the above processes have been performed for the elements around the base element. If not, step S503 is repeated to select a document element which is closest to the base element from the remaining elements. Then, steps S504 and later are performed for such newly selected element.

2. Second Embodiment

Figure 22:
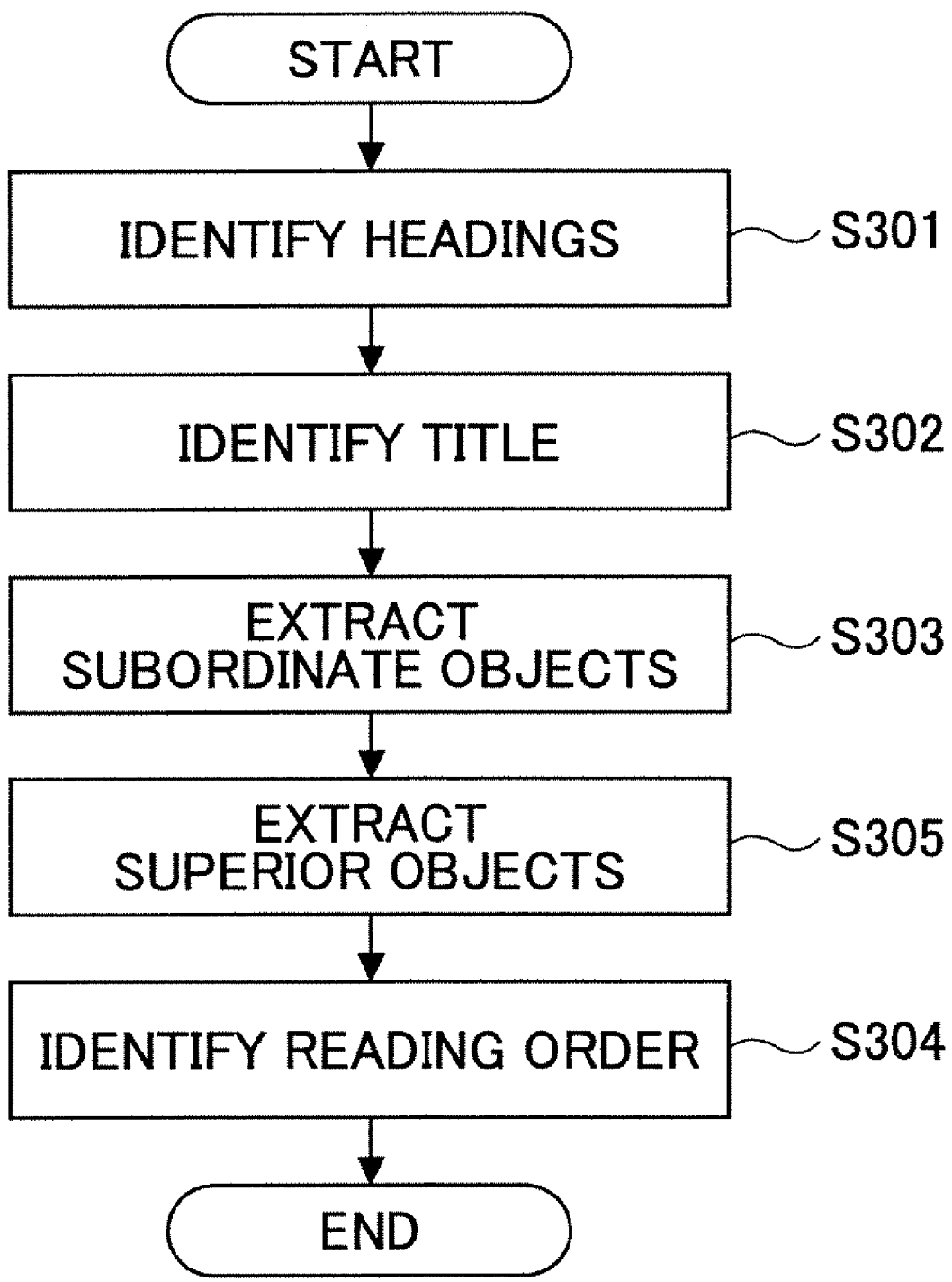
FIG. 22 is a flowchart illustrating a structure identification process in step S202 shown in FIG. 14 of a second embodiment of the present invention.

FIG. 22 is a flowchart illustrating the structure identification process (step S202 shown in FIG. 14) in the second embodiment of the present invention. FIG. 22 is different from FIG. 18 of the first embodiment in that step S305 is added. The processes in steps S301, S302, S303, and S304 are essentially the same as those in FIG. 19. A difference is that the objects extracted in step S303 are treated as subordinate objects and those subordinate objects are combined and extracted as superior objects in step S305. Superior objects are logical objects and what the object extracting unit 23 (shown in FIGS. 2 and 3) cuts out are the actual data of subordinate objects.

For the example document shown in FIG. 15, for example, subordinate objects 400 through 408 shown in FIG. 19 are extracted in step S303. In the subsequent step S305, superior objects 500, 501, and 502 shown in FIG. 25 are extracted.

Figure 23:
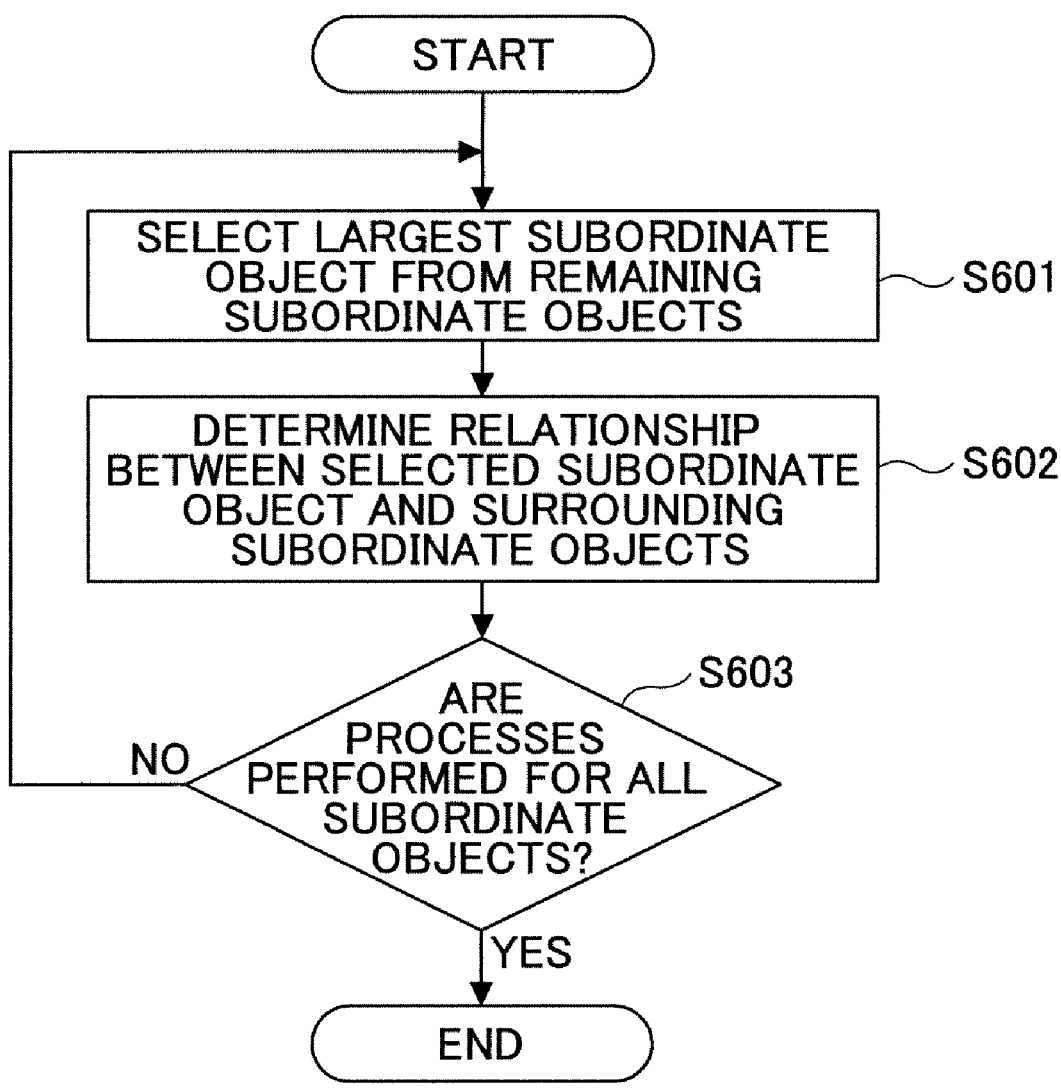
FIG. 23 is a flowchart illustrating an exemplary process in step S305 shown in FIG. 22.

FIG. 23 is a flowchart illustrating the process in step S305. Steps S601, S602, and S603 in FIG. 23 correspond to steps S401, S402, and S403 in FIG. 20. In steps S401, S402, and S403, processes are performed for document elements; in steps S601, S602, and S603, processes are performed for subordinate objects.

Figure 24:
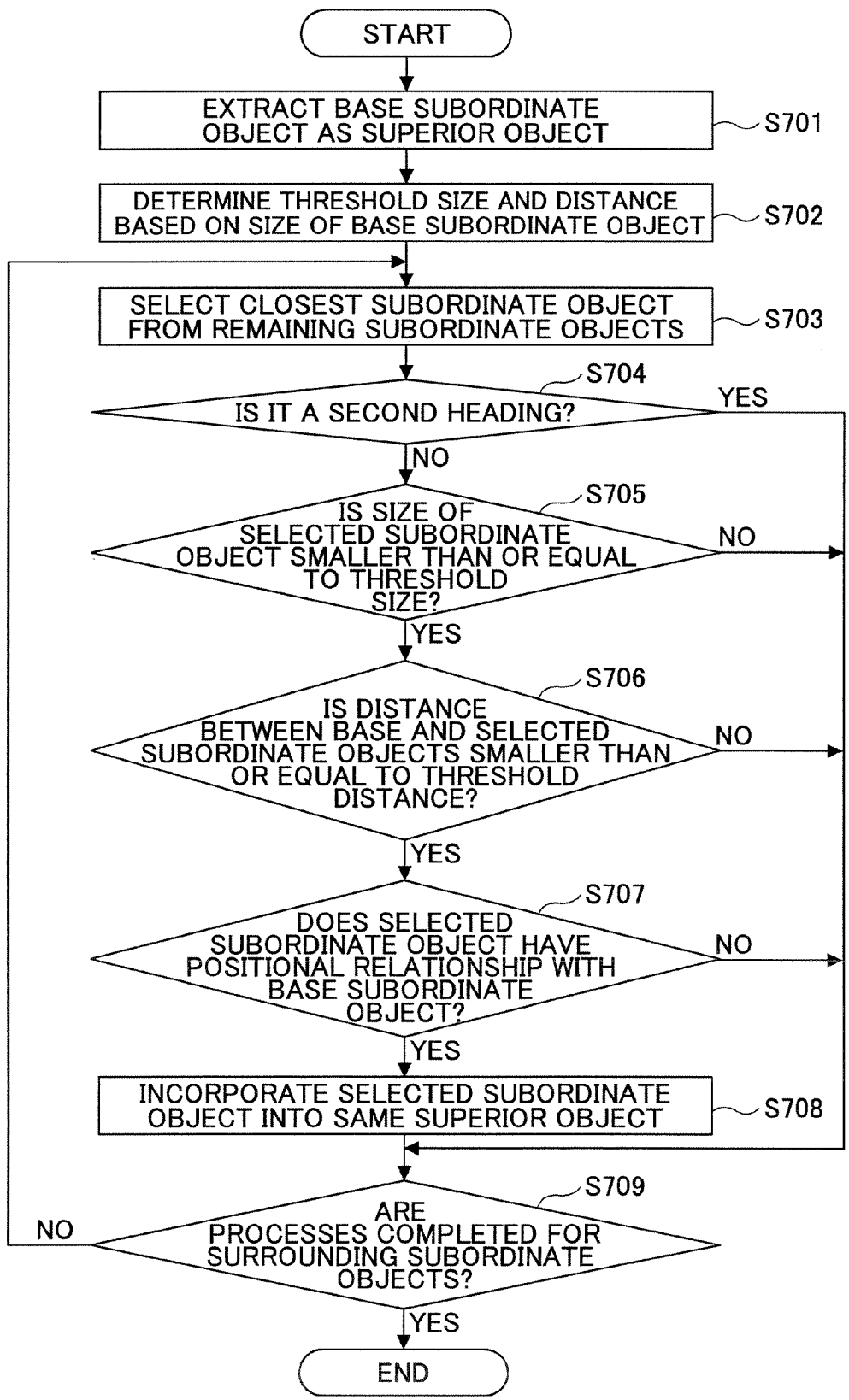
FIG. 24 is a flowchart illustrating an exemplary process in step S602 shown in FIG. 23.

FIG. 24 is a flowchart illustrating the process in step S602 shown in FIG. 23. Steps S701 through S703 and steps S705 through S709 in FIG. 24 perform for subordinate objects similar processes as those in the corresponding steps S501 through S508 in FIG. 21.

In the decision step S704 in FIG. 24, if a subordinate object with the Heading/Title attribute is already incorporated in the same superior object as that of the base subordinate object and another subordinate object with the Heading/Title attribute is selected, the incorporation of the selected object into the superior object in this exemplary embodiment is prohibited. In this decision step, Heading objects are used to determine the scope of a superior object. In a document, each heading generally indicates a block of information. Therefore, the method of determining the scope of a superior object by using headings normally works fine.

The layout of document elements in a subordinate object should be maintained even after the structure conversion by the structure converting unit (XSLT processor) 26. On the other hand, the layout of subordinate objects in a superior object may be changed by the structure conversion. However, changing the layout of subordinate objects across multiple superior objects is preferably prohibited.

The reason for the above is explained below by using an example. For the document shown in FIG. 6, superior objects 801 through 804 shown in FIG. 26 may be extracted. Switching the positions of subordinate objects "Image 1" and "Body Text 1" in the superior object 802 may not affect the interpretation of meaning much. However, as will be appreciated, switching the positions of subordinate object "Image 1" in the superior object 802 and subordinate object "Image 2" in the superior object 804 would affect the interpretation of meaning.

Figure 26:
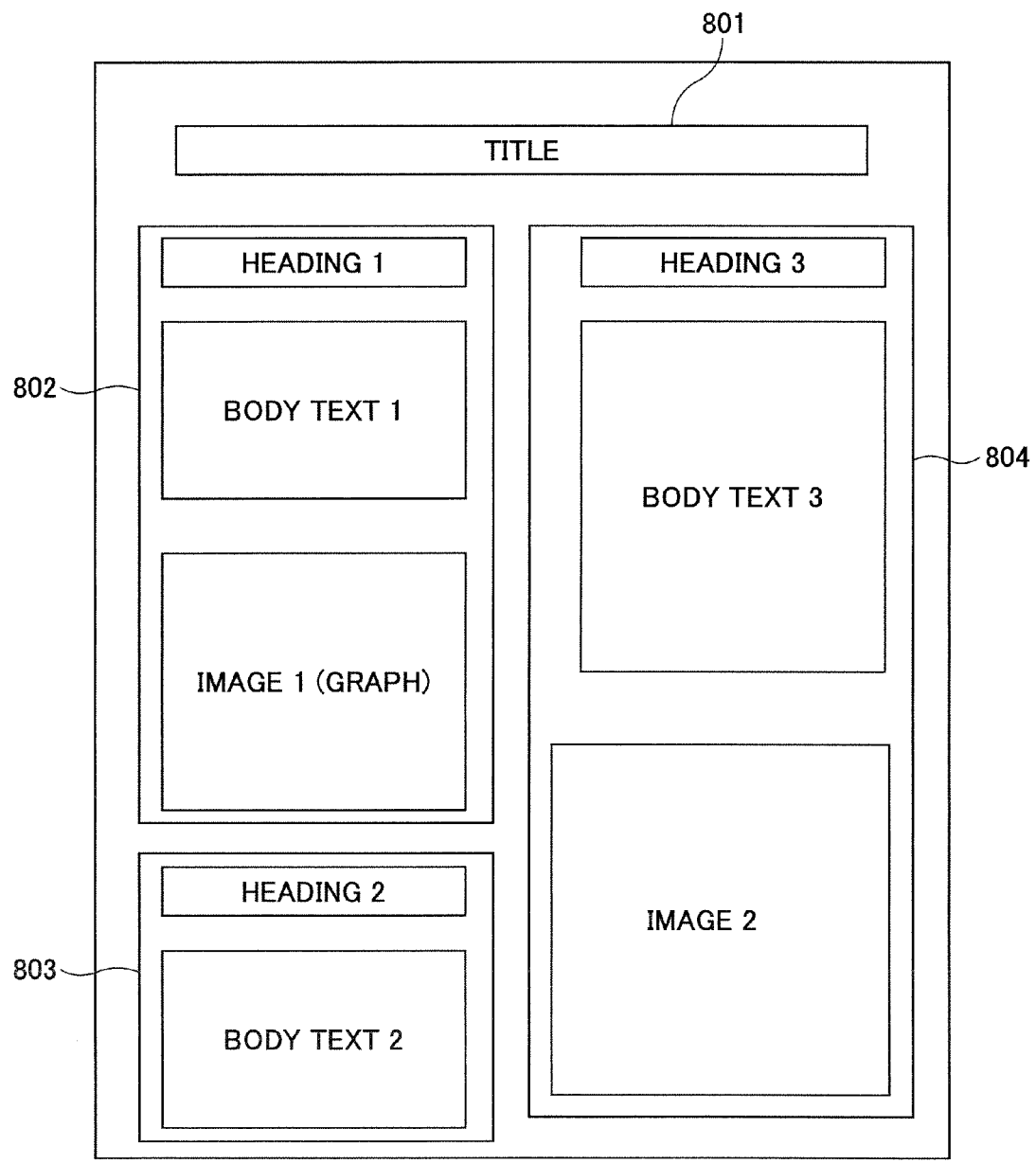
FIG. 26 is a drawing illustrating superior objects extracted from the document shown in FIG. 6.
Figure 27:
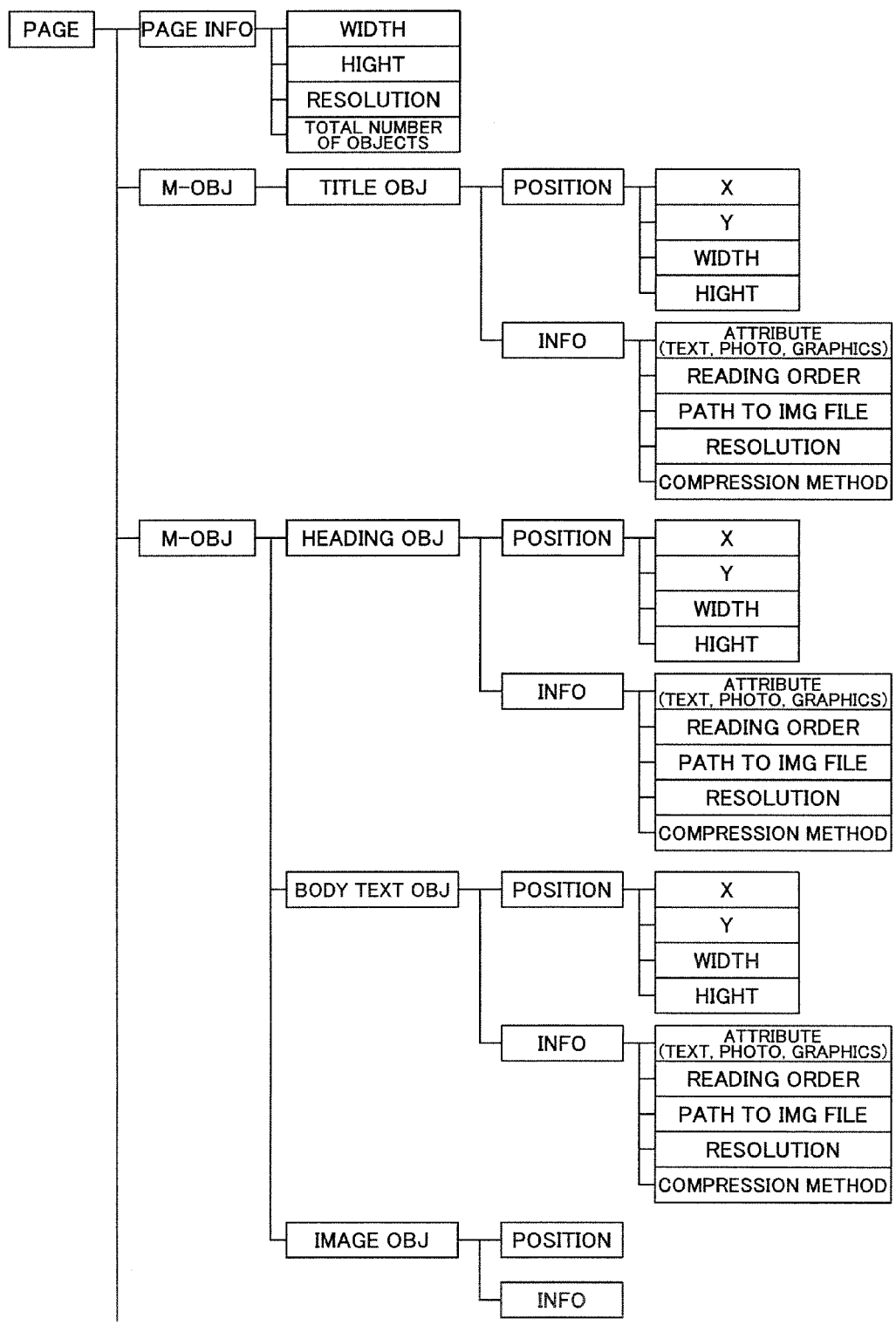
FIG. 27 is a block diagram illustrating an example of a description format of structure information including superior objects and hierarchical structure of objects.

When hierarchically structured objects as shown in FIG. 26 are extracted, the hierarchical structure of superior and subordinate objects is also stored in the structure information 24. FIG. 27 is an example of the description format of structure information including hierarchical structure of superior and subordinate objects. In FIG. 27, "M-OBJ" indicates a superior object and nodes attached to each superior object represent information on subordinate objects belonging to the superior object. The first "M-OBJ" in the tree corresponds to the superior object 801 in FIG. 26 and includes only subordinate object "Title". The second "M-OBJ" corresponds to the superior object 802 and includes subordinate objects "Heading 1", "Body Text 1", and "Image 1".

Figure 28:
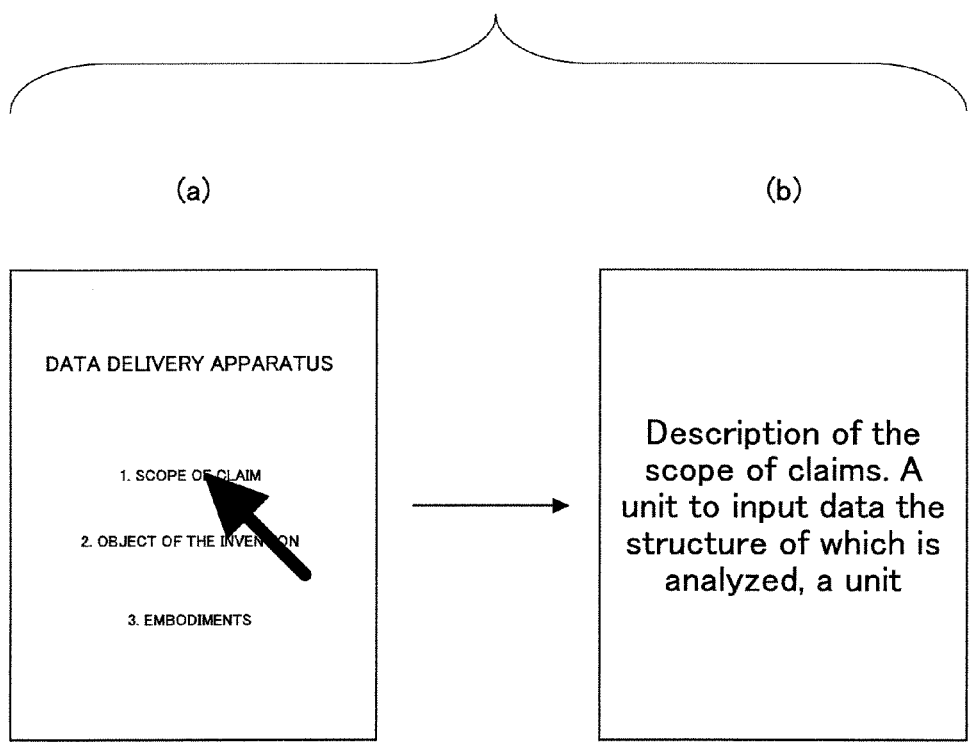
FIG. 28 is a drawing illustrating an example of displaying a document hierarchically structured as shown in FIG. 26.
Figure 29A:
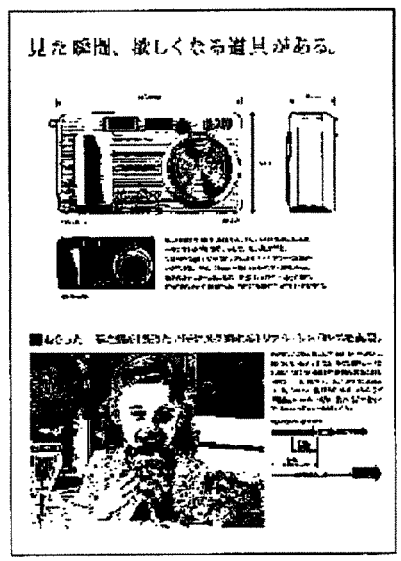
FIGS. 29A, 29B, and 29C are drawings used to describe problems in displaying a document on a small screen.
Figure 29B:
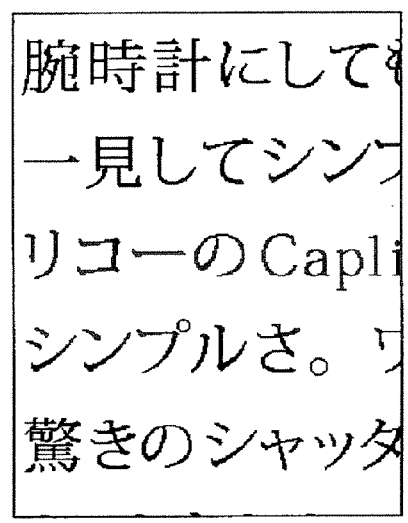
Figure 29C:
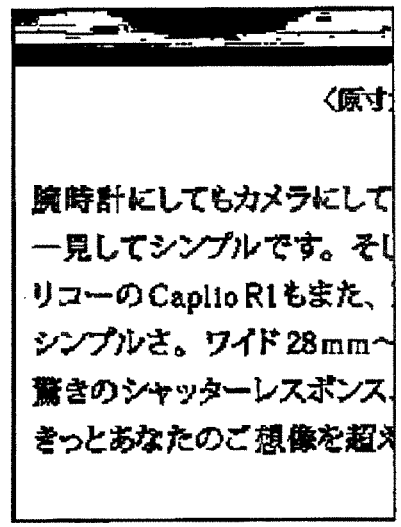

Once hierarchically structured objects as described above are extracted, it is easy to generate an interactive SVG document by using the XSLT processor 28. In such an interactive SVG document, only Title/Heading subordinate objects in the superior objects 801 through 804 shown in FIG. 26 are listed as shown in FIG. 28 (*a*). When one of the headings ("1. SCOPE OF CLAIM", for example) is specified by a client, the "Body Text" subordinate object in the corresponding superior object is displayed as shown in FIG. 28 (*b*). It is also possible to convert a document structure so as to display an object-by-object animation or an interactive document as described in the first embodiment.

In the above, embodiments of the present invention are described by using as an example of a server which delivers documents to clients after converting their structures. As mentioned above, the present invention may also be applied to a document processing apparatus which displays documents on a local display apparatus with a screen relatively smaller than the documents after converting the document structures. For example, in a multifunction printer (MFP) having functions of a printer, copier, and scanner, displaying scanned documents on a display screen on the operation panel may be desired. In such a case, if a scanned document is displayed as is, the characters may not be readable and scrolling should be repeated to view the entire document. Such problems may be solved by displaying the documents after converting their structures.

The present invention is not limited to the specifically disclosed embodiments, and variations and modifications may be made without departing from the scope of the present invention.

The present application is based on Japanese Priority Application No. 2005-178536, filed on Jun. 17, 2005, the entire contents of which are hereby incorporated herein by reference.

What is claimed is:

1. A document processing apparatus comprising:
a CPU;
a memory connected to the CPU;
a layout analysis unit which,
   extracts document elements by analyzing data of a document,
   determines relationship between the document elements,
   extracts a group of mutually related document elements as a first object and separately extracts an independent document element as a second object, and
   generates structure information defining one or more of said first and second objects in the document; and
a structure converting unit which converts the structure information generated by the layout analysis unit into display information for display in a display mode;
wherein the structure information includes a reading order of the one or more of said first and second objects, the reading order being determined by searching for the one or more of said first and second objects in the document in a top to bottom and left to right fashion, and by identifying a column setting of the document.

2. The document processing apparatus as claimed in claim 1, wherein the structure information includes attributes of the first and second objects.

3. The document processing apparatus as claimed in claim 1, wherein the display information is configured to display the first and second objects in the document one by one according to the reading order of the first and second objects.

4. The document processing apparatus as claimed in claim 1, further comprising:
an object extracting unit which extracts, from the document, actual data of the first and second objects extracted by the layout analysis unit.

5. The document processing apparatus as claimed in claim 1, wherein the layout analysis unit determines whether there is a relationship between the document elements based on conditions including size relationship, distance relationship, and positional relationship between the document elements.

6. The document processing apparatus as claimed in claim 1, wherein the layout analysis unit selects a document element largest in size as a base element from one or more document elements that have not been extracted as the first and second objects; and determines a size relationship and a distance relationship between the base element and another element around the base element based on a threshold size and a threshold distance which are determined based on the size of the base element.

7. The document processing apparatus as claimed in claim 1, wherein the display information is configured so that one or more of the first and second objects in the document are displayed in a layout having a size relatively smaller than the size of the document and a selected object in the layout is displayed as a size relatively larger than an original size of the selected object.

8. The document processing apparatus as claimed in claim 1, wherein the layout analysis unit further extracts another group of mutually related document elements as a third object and separately extracts another independent document element as a fourth object, and the layout analysis unit determines relationship between the first, second, third, and fourth objects and extracts each group of mutually related objects as a single superior object and each independent object as a single superior object; and stores hierarchical structure of the superior objects and the objects therein in the structure information.

9. The document processing apparatus as claimed in claim 8, wherein the layout analysis unit limits maximum number of objects with heading attribute in a superior object to one.

10. The document processing apparatus as claimed in claim 8, wherein changing layout of objects across superior objects is prohibited in the structure conversion by the structure converting unit.

11. The document processing apparatus as claimed in claim 1, wherein the display information is configured to display the first and second objects in the document one by one at different start times in an animated fashion according to the reading order of the first and second objects.

12. The document processing apparatus as claimed in claim 1, wherein the reading order is further determined based on a positional relationship between the first and second objects.

13. A document processing method comprising:
extracting, by a layout analysis unit using a processor, document elements by analyzing data of a document;
determining, by the layout analysis unit using the processor, relationship between the document elements;
extracting, by the layout analysis unit using the processor, a group of mutually related document elements as a first object and separately extracting an independent document element as a second object;
generating, by the layout analysis unit using the processor, structure information defining one or more of said first and second objects in the document; and
converting, by a structure converting unit using the processor, the structure information generated by the layout analysis unit into display information for display in a display mode, wherein the structure information includes a reading order of the one or more of said first and second objects, the reading order being determined by searching for the one or more of said first and second objects in the document in a top to bottom and left to right fashion, and by identifying a column setting of the document.

14. The document processing method as claimed in claim 13, wherein the structure information includes attributes of the first and second objects.

15. The document processing method as claimed in claim 13, wherein the determining of the relationship between the document elements is based on conditions including size relationship, distance relationship, and positional relationship between the document elements.

16. The document processing method as claimed in claim 13, wherein the display information is configured so that one or more of the first and second objects in the document are displayed in a layout having a size relatively smaller than the size of the document and a selected object in the layout is displayed as a size relatively larger than an original size of the selected object.

17. A non-transitory computer-readable storage medium having computer executable instructions recorded thereon, wherein the instructions, when executed by a computer, cause the computer to perform a method for document processing, the method comprising:

extracting, by a layout analysis unit using a processor, document elements by analyzing data of a document;

determining, by the layout analysis unit using the processor, relationship between the document elements;

extracting, by the layout analysis unit using the processor, a group of mutually related document elements as a first object and separately extracting an independent document element as a second object;

generating, by the layout analysis unit using the processor, structure information defining one or more of said first and second objects in the document; and converting, by a structure converting unit using the processor, the structure information generated by the layout analysis unit into display information for display in a display mode, wherein the structure information includes a reading order of the one or more of said first and second objects, the reading order being determined by searching for the one or more of said first and second objects in the document in a top to bottom and left to right fashion, and by identifying a column setting of the document.

18. The computer-readable storage medium as claimed in claim 17, said method further comprising:

extracting, by an object extracting unit, from the document, actual data of the first and second objects extracted by the layout analysis unit.

* * * * *